(12) United States Patent
Pakulski et al.

(10) Patent No.: US 8,611,590 B2
(45) Date of Patent: Dec. 17, 2013

(54) VIDEO OBJECT FRAGMENTATION DETECTION AND MANAGEMENT

(75) Inventors: Peter Jan Pakulski, Marsfield (AU); Daniel John Wedge, St Leonards (AU); Ashley Partis, Rozelle (AU); David Kenji See, Artarmon (AU)

(73) Assignee: Canon Kabushiki Kaisha, Tokyo (JP)

( * ) Notice: Subject to any disclaimer, the term of this patent is extended or adjusted under 35 U.S.C. 154(b) by 1028 days.

(21) Appl. No.: 12/645,611

(22) Filed: Dec. 23, 2009

(65) Prior Publication Data

US 2010/0157089 A1  Jun. 24, 2010

(30) Foreign Application Priority Data

Dec. 23, 2008  (AU) ................................. 2008261195
Dec. 23, 2008  (AU) ................................. 2008261196

(51) Int. Cl.
*G06K 9/00*  (2006.01)

(52) U.S. Cl.
USPC .......................................................... 382/103

(58) Field of Classification Search
USPC .................................. 382/103; 348/169–172
See application file for complete search history.

(56) References Cited

U.S. PATENT DOCUMENTS

| | | | |
|---|---|---|---|
| 5,809,161 A | 9/1998 | Auty et al. | |
| 5,969,755 A | 10/1999 | Courtney | |
| 6,169,573 B1 | 1/2001 | Sampath-Kumar et al. | |
| 6,233,007 B1 * | 5/2001 | Carlbom et al. | 348/157 |
| 6,295,367 B1 | 9/2001 | Crabtree et al. | |
| 6,404,455 B1 | 6/2002 | Ito et al. | |
| 6,711,278 B1 * | 3/2004 | Gu et al. | 382/103 |
| 6,876,999 B2 | 4/2005 | Hill et al. | |
| 7,142,600 B1 * | 11/2006 | Schonfeld et al. | 375/240.16 |
| 2001/0046309 A1 * | 11/2001 | Kamei | 382/103 |
| 2003/0035051 A1 * | 2/2003 | Cho et al. | 348/169 |
| 2003/0108220 A1 * | 6/2003 | Jepson et al. | 382/103 |
| 2004/0100557 A1 * | 5/2004 | Roberts et al. | 348/169 |
| 2008/0123968 A1 * | 5/2008 | Nevatia et al. | 382/228 |

\* cited by examiner

*Primary Examiner* — Yubin Hung
(74) *Attorney, Agent, or Firm* — Fitzpatrick, Cella, Harper & Scinto

(57) ABSTRACT

Disclosed herein are a computer-implemented method and a camera system for determining a current spatial representation for a detection in a current frame of an image sequence. The method derives an expected spatial representation (820) for the detection based on at least one previous frame, generates a spatial representation (810) of the detection, and extends the spatial representation (810) to obtain an extended spatial representation (830), based on the expected spatial representation (820). The method determines a similarity measure between the extended spatial representation (830) and the expected spatial representation (820), and then determines the current spatial representation for the detection to based on the similarity measure.

19 Claims, 26 Drawing Sheets

VIDEO OBJECT FRAGMENTATION DETECTION AND MANAGEMENT

RELATED APPLICATIONS

This application claims the right of priority under 35 U.S.C. §119 based on Australian Patent Application No. 2008261195 entitled "Video Object fragmentation detection and management", filed on 23 Dec., 2008 in the name of Canon Kabushiki Kaisha, and Australian Patent Application No. 2008261196 entitled "Backdating object splitting", filed on 23 Dec., 2008 in the name of Canon Kabushiki Kaisha, the entire contents of each of which are incorporated herein by reference as if fully set forth herein.

TECHNICAL FIELD

The present disclosure relates to the tracking of objects in an image sequence and, in particular, to the merging of multiple fragment detections.

DESCRIPTION OF BACKGROUND ART

One approach for video object tracking is to utilize an extraction process to extract object locations from a video frame and an object tracking process to associate those locations with each other over several video frames, and thus over time.

The extraction process can introduce errors, as the measurements of object locations and object characteristics may be inaccurate. For example, several locations may be extracted for a single real-world object, or the detected width of an object may be smaller than the actual width of the object. The errors introduced in extraction depend on the algorithm used and the complexity of the scene shown in the video frame that is being processed. The errors include, but are not limited to: detection failure, partial detection failure, multiple detections in place of one detection, one detection in place of multiple detections, over-detection, and entirely false detections. These errors can occur contemporaneously within a single frame of an image sequence.

The extraction process may additionally produce errors where the correct measurements are unavailable in the data to be extracted. This can happen, for example, where a real-world object is placed against a background of a similar brightness and hue, where the real-world object is otherwise not fully visible, or where the real-world object is overlapping with or near another active object.

Even correct object-location data can be difficult and complex. A difficult case for the tracking task occurs when the object whose visual location is to be extracted is partially or fully occluded.

A particular problem caused by errors introduced in the tracking process is the case where multiple detections are made in place of a single detection. When multiple detections occur erroneously, a tracker may fail to continue the original track, and/or create new tracks for the multiple detections inappropriately. One approach to this problem is to treat all detections within a certain distance of each other as being the same object. A disadvantage of this approach is that it frequently leads to the merging of objects which are coincidentally close, but which should not be merged. This over-merging disadvantage causes additional detection failures as a result. Also, over-merging can create objects which are not recognizably part of any track, which again leads to the inappropriate creation of new tracks.

The tracking stage of the processing creates tracks. Tracks usually have a stochastic basis, e.g., a Kalman Filter or an Alpha Beta Filter. The Kalman Filter equations or Alpha Beta Filter equations can be used to produce an expected spatial representation, also known as an expectation. An expected spatial representation is a predicted future location of a tracked object to within predetermined measurement noise limits for that particular application. Another known tracking method is to expect that a future measurement should be near the most recent measurement.

In some tracking approaches, the expectation is expanded to allow for error, and all detections smaller than the expectation and falling within the expanded area are treated as partially-detected components of the track being estimated. These approaches, however, are limited to correcting detections which are smaller than the expectation. For example, the approach fails when an object moves towards the camera and appears to become larger. Where other heuristics are used, the problem remains that trade-offs must be made, for example, computational complexity versus an optimal solution.

Another approach is to segment the object into clusters, and look at the average motion of each cluster. If the motion vector for a block in a detection is similar to the motion for a nearby cluster, then the block may be considered part of the cluster, and thus part of the object. However, this method is computationally expensive and requires that motion vectors for individual blocks be calculated along with the motion of the object and the clusters that constitute the object.

Thus, a need exists to provide an improved method and system for tracking objects in an image sequence.

SUMMARY

It is an object of the present invention to overcome substantially, or at least ameliorate, one or more disadvantages of existing arrangements.

According to a first aspect of the present disclosure, there is provided a computer-implemented method of determining a current spatial representation for a detection in a current frame of an image sequence. The method derives an expected spatial representation for the detection based on at least one previous frame, generates a spatial representation of the detection, and extends the spatial representation to obtain an extended spatial representation, based on the expected spatial representation. The method determines a similarity measure between the extended spatial representation and the expected spatial representation, and then determines the current spatial representation for the detection based on the similarity measure.

According to a second aspect of the present disclosure, there is provided a computer-implemented method of associating at least one of a plurality of detections in a frame of an image sequence with a track. For each one of the plurality of detections, the method performs the following steps. The method determines an initial spatial similarity measure between an expected spatial representation associated with the track and a spatial representation of the detection, and then determines an extended similarity measure between the expected spatial representation of the track and an extended spatial representation of the detection. The method then associates the detection with the track, based on at least one of: (i) the initial spatial similarity measure exceeding a direct association threshold; and (ii) the extended representation similarity measure exceeding a fragment similarity threshold.

According to a third aspect of the present disclosure, there is provided a camera system for classifying a detection in a frame of an image sequence as a fragment of a video object in the frame, based on a spatial similarity between the detection and an expected spatial representation for a track associated with the image sequence. The camera system includes a lens system, a camera module coupled to the lens system to capture at least one frame in the image sequence, a storage device for storing a computer program, and a processor for executing the program.

The program includes code for deriving an extended spatial representation from a spatial representation of the detection, wherein at least one dimension of the extended spatial representation is at least as large as a corresponding dimension of the expected spatial representation, code for determining an extended spatial similarity measure between the extended spatial representation and the expected spatial representation, and code for determining the detection as a fragment of the video object, based on the extended spatial similarity measure exceeding a fragment similarity threshold.

According to a fourth aspect of the present disclosure, there is provided a computer-implemented method of associating an association hypothesis with a track associated with an image, based on a plurality of fragments detected in the image. The method generates a plurality of association hypotheses based on the track and the fragments, each association hypothesis including an expectation associated with the track and a combination of at least one fragment associated with the expectation. For each association hypothesis, the method performs the steps of: determining a matching similarity score, based on the expectation and at least one characteristic of at least one fragment in the combination of the association hypothesis, and adjusting the matching similarity score, based on a number of fragments in the combination of the association hypothesis. The method then selects an association hypothesis from the plurality of association hypotheses, based on the adjusted matching similarity scores of the association hypotheses, and associates the selected association hypothesis with the track.

According to a fifth aspect of the present disclosure, there is provided a computer-implemented method of associating an association hypothesis with a track associated with an image, based on a fragment detected in the image and a plurality of tracks associated with the image. The method generates a plurality of association hypotheses based on the fragment and the plurality of tracks, each association hypothesis including the detection and a combination of at least one expectation associated with the detection, wherein each expectation is associated with one of the tracks. For each association hypothesis, the method performs the steps of: determining a similarity score for each association hypothesis, based on the detection and at least one characteristic of at least one track in the combination of the association hypothesis; and adjusting the similarity score, based on a number of track expectations included in the hypothesis. The method then selects an association hypothesis, based on the similarity scores for the association hypotheses, and associates the selected association hypothesis with the track.

According to a sixth aspect of the present disclosure, there is provided method of determining a detection as a fragment of a video object in a video frame sequence, based on a spatial similarity between a track associated with the video frame sequence and the detection in a video frame of the video frame sequence. The method derives an extended spatial representation from a spatial representation of the detection, wherein at least one dimension of the extended spatial representation is at least as large as a corresponding dimension of an expected spatial representation of the track. The method determines an extended spatial similarity between the extended spatial representation and the expected spatial representation, and then determines the detection as a fragment of the video object when the extended spatial similarity exceeds an extended representation similarity threshold.

BRIEF DESCRIPTION OF THE DRAWINGS

One or more embodiments of the invention will now be described with reference to the following drawings, in which.

DETAILED DESCRIPTION

Figure 1A:
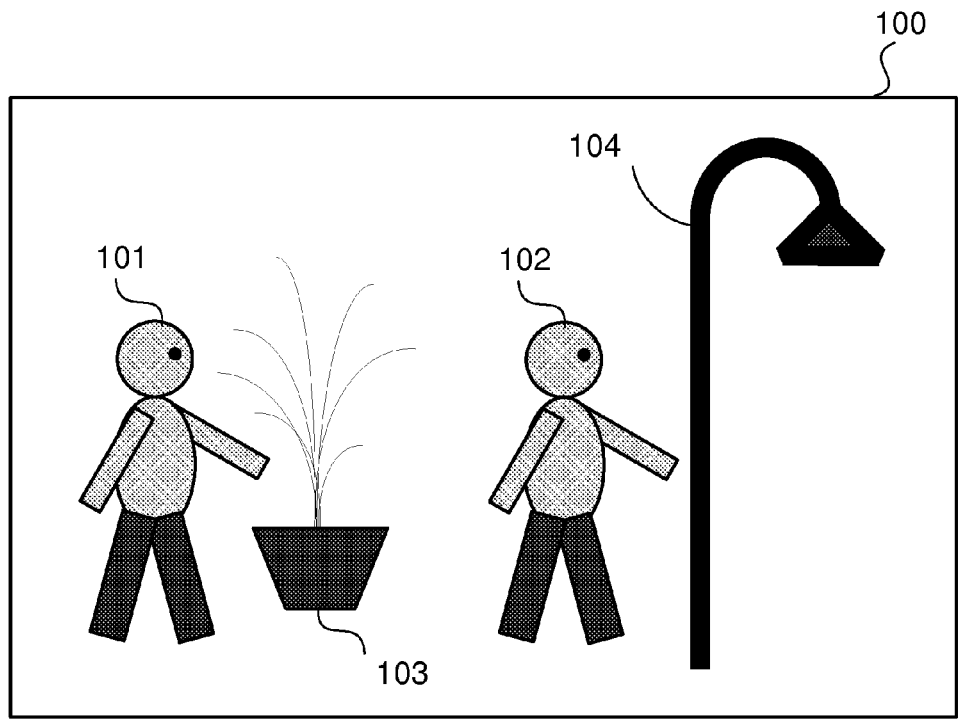
FIG. 1A illustrates a frame from a frame sequence.

Where reference is made in any one or more of the accompanying drawings to steps and/or features that have the same reference numerals, those steps and/or features have for the purposes of this description the same function(s) or operation(s), unless the contrary intention appears.

[Overview]

Disclosed herein are a method and system for detecting video object fragmentation. An embodiment of the present disclosure processes detections as partial detections, or fragments, and expands the detections for evaluation. The evaluation of partial detections can be performed utilizing the same mathematical process that is utilized for evaluation of normal detections.

The present disclosure provides a computer-implemented method of determining a current spatial representation for a detection in a current frame of an image sequence. The method derives an expected spatial representation for the detected object based on at least one previous frame, generates a spatial representation of the detection, and extends the spatial representation to obtain an extended spatial representation, based on the expected spatial representation. The method determines a similarity measure between the extended spatial representation and the expected spatial representation, and then determines the current spatial representation for the detection based on the similarity measure.

The present disclosure also provides a camera system for classifying a detection in a frame of an image sequence as a fragment of a video object in the frame, based on a spatial similarity between the detection and an expected spatial representation for a track associated with the image sequence. The camera system includes a lens system, a camera module coupled to the lens system to capture at least one frame in the image sequence, a storage device for storing a computer program, and a processor for executing the program.

The program includes code for deriving an extended spatial representation from a spatial representation of the detection, wherein at least one dimension of the extended spatial representation is at least as large as a corresponding dimension of the expected spatial representation, code for determining an extended spatial similarity measure between the extended spatial representation and the expected spatial representation, and code for determining the detection as a fragment of the video object, based on the extended spatial similarity measure exceeding a fragment similarity threshold.

[Introduction]

A video is a sequence of images or frames. Thus, each frame is an image in an image sequence. Each frame of the video has an x axis and a y axis. A scene is the information contained in a frame and may include, for example, foreground objects, background objects, or a combination thereof. A scene model is stored information relating to a background. A scene model generally relates to background information derived from one or more frames of an image sequence. A video may be encoded and compressed. Such encoding and compression may be performed intra-frame, such as motion-JPEG (M-JPEG), or inter-frame, such as specified in the H.264 standard.

An image is made up of visual elements. The visual elements may be, for example, pixels, or 8×8 DCT (Discrete Cosine Transform) blocks as used in JPEG images in a motion-JPEG stream.

For the detection of real-world objects visible in a video, a foreground separation method is applied to individual frames of the video, resulting in detections. Other methods of detecting real-world objects visible in a video are also known and may equally be practiced. Such methods include, for example, image segmentation.

In one arrangement, foreground separation is performed by frame differencing. Frame differencing subtracts a current frame that is being processed from a previous frame. In another arrangement, foreground separation is done by background modelling. Background modelling creates a scene model by aggregating the visual characteristics of pixels or blocks in the scene over multiple frames spanning a time period. Visual characteristics that have contributed consistently to the model over a number of frames are considered to form the background. Any area, or portion of the frame, where the current frame differs significantly from the background in the scene model is then considered to be foreground.

Figure 1B:
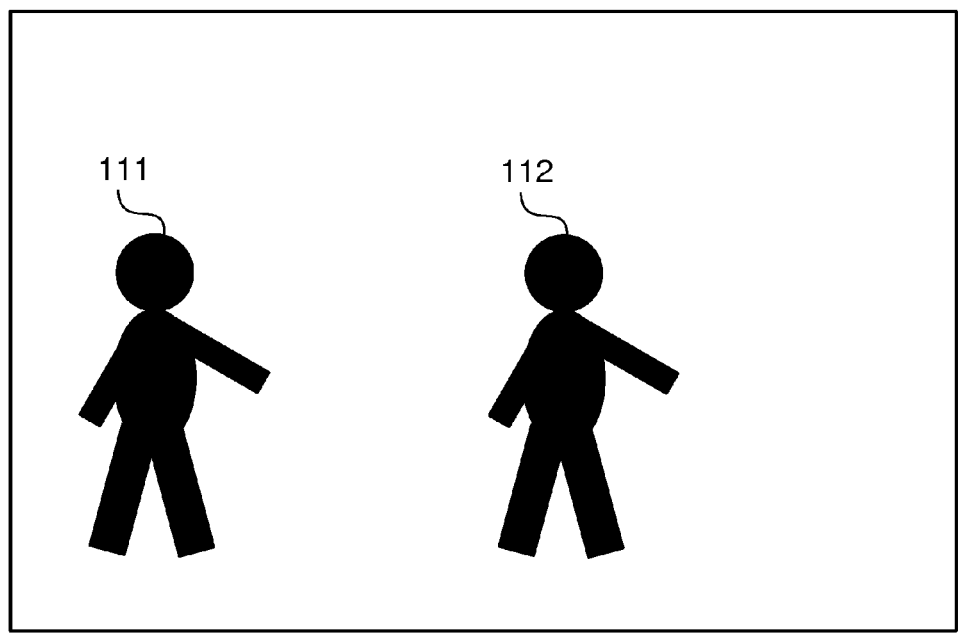
FIG. 1B illustrates the output of applying a video object detection method to the frame of a frame sequence illustrated in FIG. 1A.

FIG. 1A illustrates a video frame 100 that is provided as an input to a foreground separation method. The video frame 100 shows a scene containing a number of objects: a first person 101 and a second person 102, a plant 103, and a lamp post 104. The plant 103 and the lamp post 104 are background objects, as determined by comparing the present video frame to one or more preceding video frames. Therefore, the foreground separation method detects only two foreground objects. The detected foreground objects are illustrated in FIG. 1B. One detected foreground object 111 corresponds to the first person 101 from the input video frame. The other detected foreground object 112 in FIG. 1B corresponds to the second person 102 from the input video frame.

Figure 2A:
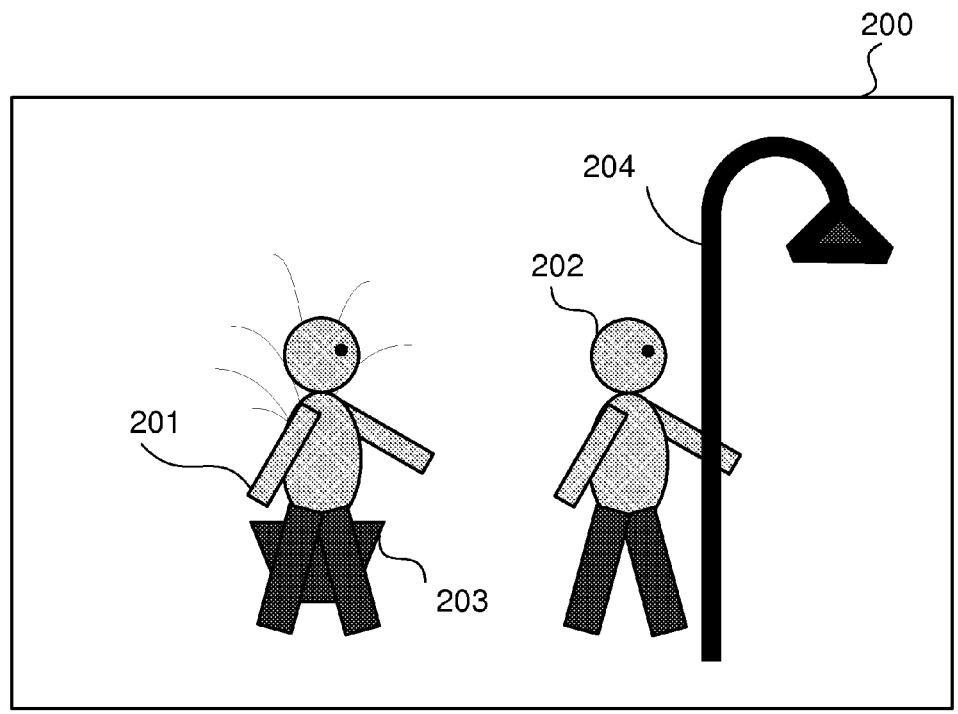
FIG. 2A illustrates a frame from a frame sequence.

A more complicated video frame 200 that is provided as input to a foreground separation method is shown in FIG. 2A. In this case, a first person 201 is passing in front of a plant 203. A second person 202 is passing behind a lamp post 204.

Figure 2B:
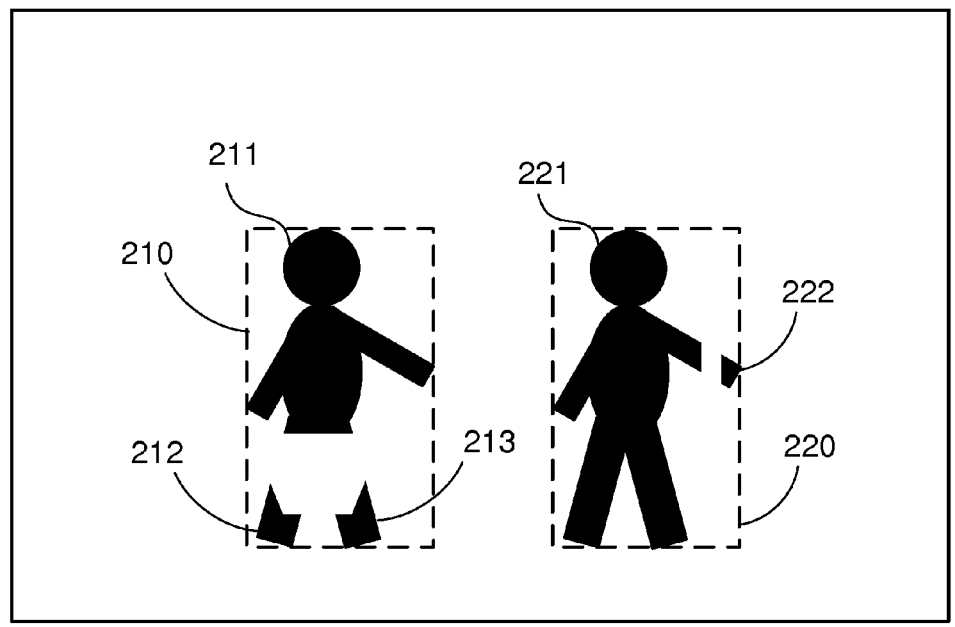
FIG. 2B illustrates the output of applying a video object detection method to the frame of a frame sequence illustrated in FIG. 2A.

FIG. 2B illustrates the output of the foreground separation method when applied to the frame 200 of FIG. 2A. The first person 201 is represented by three foreground detections 211, 212 and 213. This occurred because the pot containing the plant 203 is of a similar shade and texture as the trousers worn by the first person 201 passing in front of the plant 203. Thus, the foreground separation method was unable to distinguish between the texture and shading of the pot (the background) and the similar texture and shading of the trousers of the first person 201 (the actual foreground). Ideally, a tracking process tracking the first person 201 would associate the three detections 211, 212 and 213 contained within the dashed box 210 with the track of the first person 201.

It is also seen in FIG. 2B that the second person 202 is represented by two foreground detections 221 and 222. In this case, the lamp post 204, considered to be a background object from a comparison with one or more earlier frames, occludes a foreground person 202. Hence, the second person 202 is detected as two partial detections 221 and 222, one on each side of the lamp post. Ideally, a tracking process tracking the second person 202 would associate the two detections 221 and 222 contained within the dashed box 220 with the track of the second person 202. The partial detections 221 and 222 may be referred to as fragments, as the partial detections 221 and 222 represent partial detections relative to an expectation derived from one or more preceding frames.

The examples of FIGS. 1 and 2 highlight some of the difficulties faced by a foreground separation method and the need for a video object fragmentation detection method.

In one arrangement, a detection has a spatial representation comprising the size and position of the detection. The size of the detection is the height and width of a bounding box for the detection. In another arrangement, the detection may include a visual component, such as a visual signature. In other arrangements, there may be more characteristics associated with the spatial representation of a detection. Such characteristics can include, for example, one or more of a roundness measure, a principal axis, density, area (such as number of pixels or blocks within the detections), colour descriptors, or texture descriptors. The characteristics may be based, for example, on a silhouette of the object, or on the original visual content corresponding to the object. In one arrangement, the position of the spatial representation of the detection is the top-left corner of a bounding box (with width and height) of the detection. In another arrangement, the position of the spatial representation of the detection is the centroid of the spatial representation of the detection, the width of the spatial representation of the detection is the difference between the greatest and smallest x-coordinate that is part of the detection, and the height is computed in a similar fashion along the y-axis. In yet another arrangement, the position of the spatial representation is the centre of a minimal bounding box for the detection.

A track is an ordered sequence of identifiers of a real-world object over time, derived from the detections of the real-world object that have been extracted from frames of one or more frame sequences. In one arrangement, the identifier of a real-world object is comprised of the frame number and the one or more identifiers of the detections in that frame corresponding to the real-world object. In another arrangement, the identifiers are the positions of the spatial representations of the detections in a list of detections. In another arrangement, the identifiers are comprised of the frame numbers in which the object is visible as it moves through the video and the corresponding detection data. In another arrangement, the identifiers are the detection data. In another arrangement, the identifiers are comprised of the positions of the detections comprising the track.

A tracker maintains a collection of tracks. A track may be maintained over multiple frames and multiple sequences of frames. For example, a track may be maintained over a plurality of frames in a single sequence of frames. In another example, a track may be maintained over multiple sequences of frames, such as may occur when an object is tracked by multiple cameras.

For each frame that is being processed, the tracker creates an expected spatial representation, which will be referred to as an expectation, for each track based on the track's previous attributes. The track from which the expectation was computed is referred to as the expectation's source track. For any given frame, there may be zero, one, or multiple tracks associated with the frame.

In one arrangement, the attributes of an expectation are the size, the velocity, and the position of the tracked object. Given a track's expectation, and a set of spatial representations of detections in a frame, the tracker can compute a matching similarity for pairs of expectations and detections. The computation of the matching similarity is described in more detail later. In another arrangement, the attributes of an expectation may include a visual component, such as a visual signature. In other arrangements, there may be more characteristics associated with the expectation, for example, a roundness measure, a principal axis, density, area, colour descriptors, or texture descriptors.

If the matching similarity score meets or exceeds a threshold, the detection may be associated with the track. If a detection is smaller than the expectation according to the matching similarity score, the detection may be a fragmented detection (also referred to as a fragment).

[Computer Implementation]

Figure 3A:
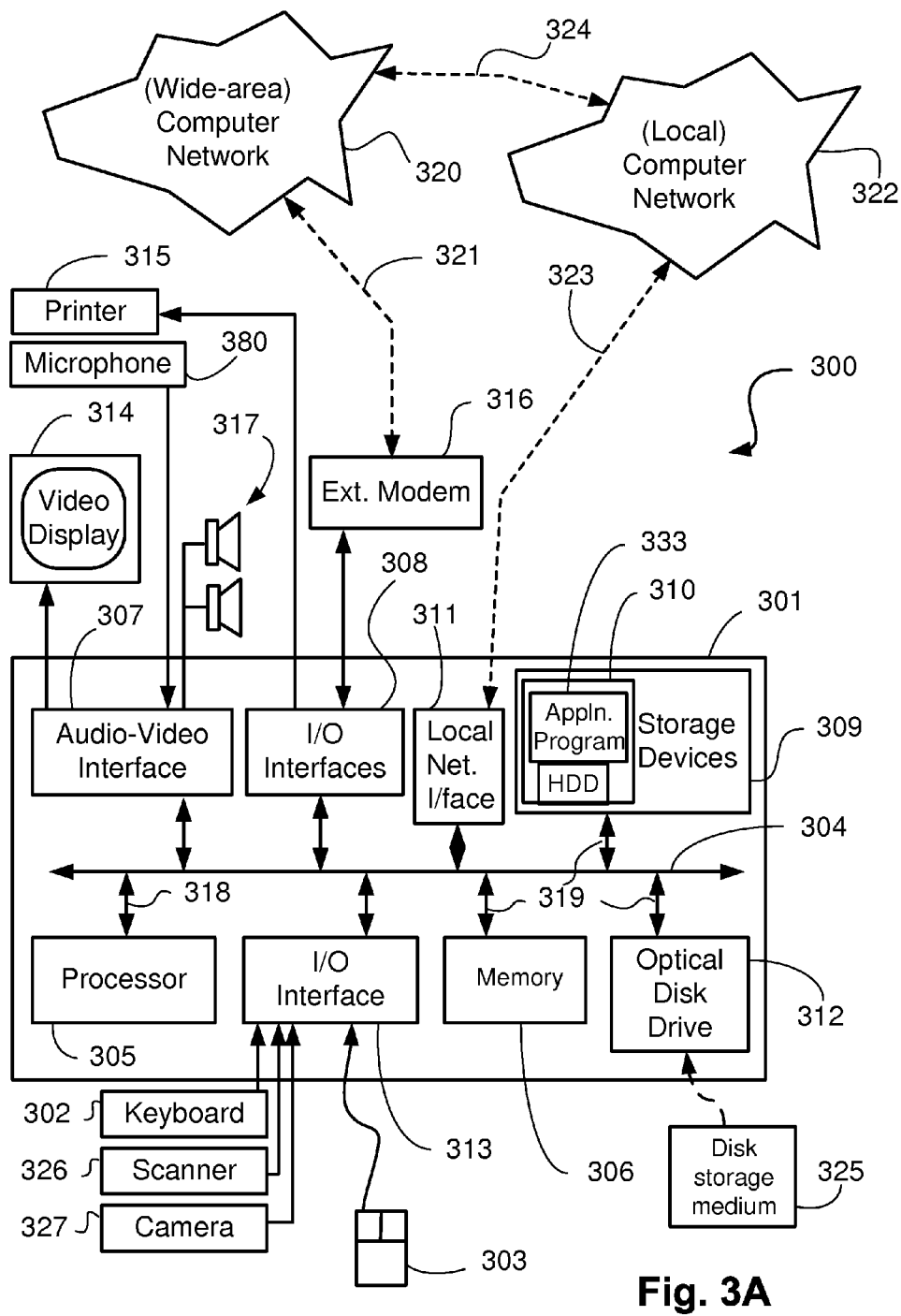
FIGS. 3A and 3B form a schematic block diagram of a general purpose computer system upon which arrangements described can be practiced.
Figure 3B:
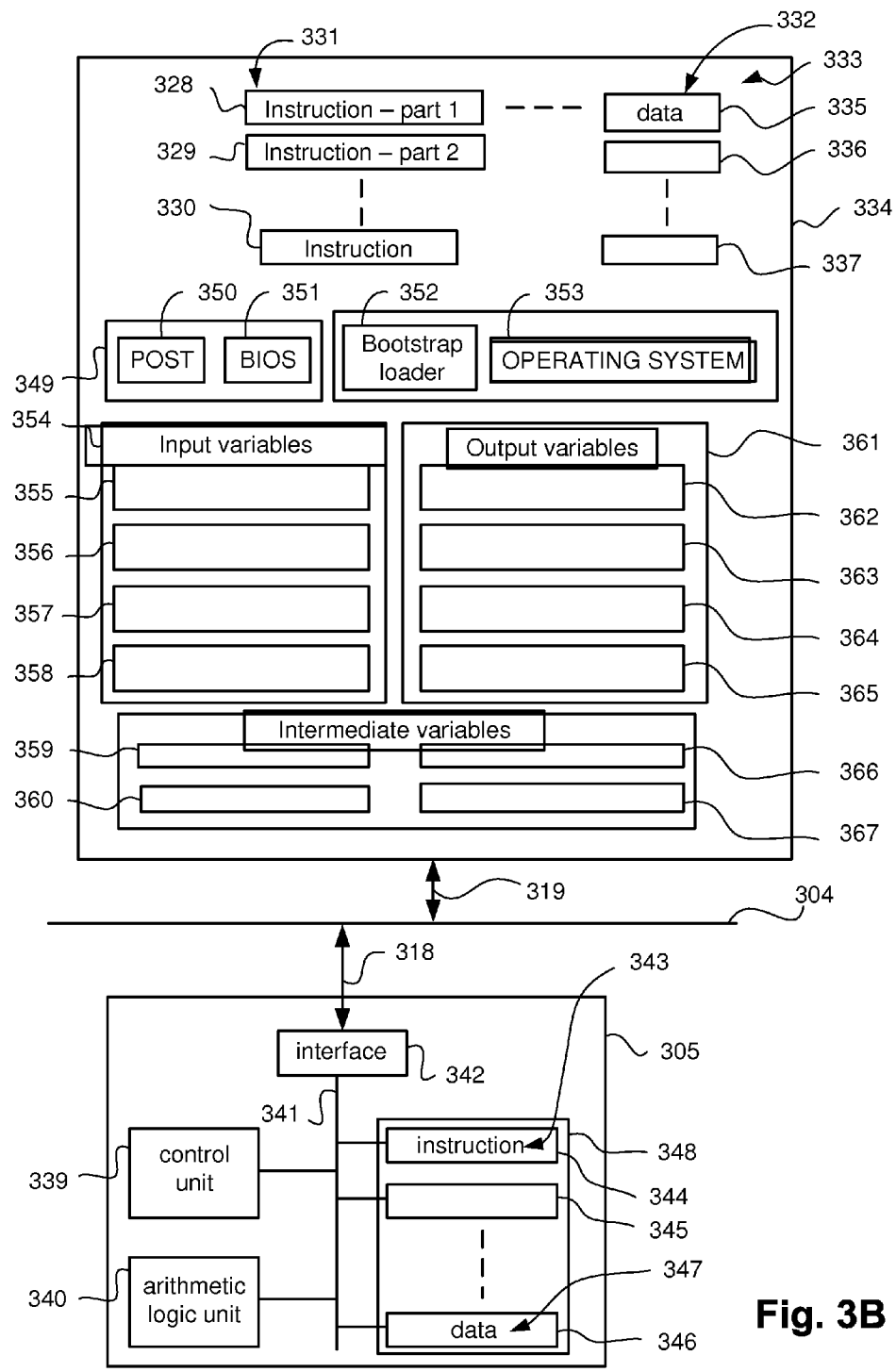

FIGS. 3A and 3B collectively form a schematic block diagram of a general purpose computer system 300, upon which the various arrangements described can be practiced.

As seen in FIG. 3A, the computer system 300 is formed by a computer module 301, input devices such as a keyboard 302, a mouse pointer device 303, a scanner 326, a camera 327, and a microphone 380, and output devices including a printer 315, a display device 314 and loudspeakers 317. An external Modulator-Demodulator (Modem) transceiver device 316 may be used by the computer module 301 for communicating to and from a communications network 320 via a connection 321. The network 320 may be a wide-area network (WAN), such as the Internet, or a private WAN. Where the connection 321 is a telephone line, the modem 316 may be a traditional "dial-up" modem. Alternatively, where the connection 321 is a high capacity (e.g.: cable) connection, the modem 316 may be a broadband modem. A wireless modem may also be used for wireless connection to the network 320.

The computer module 301 typically includes at least one processor unit 305, and a memory unit 306 for example formed from semiconductor random access memory (RAM) and semiconductor read only memory (ROM). The module 301 also includes an number of input/output (I/O) interfaces including an audio-video interface 307 that couples to the video display 314, loudspeakers 317 and microphone 380, an I/O interface 313 for the keyboard 302, mouse 303, scanner 326, camera 327 and optionally a joystick (not illustrated), and an interface 308 for the external modem 316 and printer 315. In some implementations, the modem 316 may be incorporated within the computer module 301, for example within the interface 308. The computer module 301 also has a local network interface 311 which, via a connection 323, permits coupling of the computer system 300 to a local computer network 322, known as a Local Area Network (LAN). As also illustrated, the local network 322 may also couple to the network 320 via a connection 324, which would typically include a so-called "firewall" device or device of similar functionality. The interface 311 may be formed by an Ethernet™ circuit card, a Bluetooth™ wireless arrangement or an IEEE 802.11 wireless arrangement.

The interfaces 308 and 313 may afford either or both of serial and parallel connectivity, the former typically being implemented according to the Universal Serial Bus (USB) standards and having corresponding USB connectors (not illustrated). Storage devices 309 are provided and typically include a hard disk drive (HDD) 310. Other storage devices such as a floppy disk drive and a magnetic tape drive (not illustrated) may also be used. An optical disk drive 312 is typically provided to act as a non-volatile source of data. Portable memory devices, such optical disks (e.g., CD-ROM, DVD), USB-RAM, and floppy disks, for example, may then be used as appropriate sources of data to the system 300.

The components 305 to 313 of the computer module 301 typically communicate via an interconnected bus 304 and in a manner which results in a conventional mode of operation of the computer system 300 known to those in the relevant art. Examples of computers on which the described arrangements can be practiced include IBM-PCs and compatibles, Sun Sparcstations, Apple Mac™, or alike computer systems evolved therefrom.

The method of detecting video object fragmentation may be implemented using the computer system 300 wherein the processes of FIGS. 4 to 21, to be described, may be implemented as one or more software application programs 333 executable within the computer system 300. In particular, the steps of the method of detecting video object fragmentation are effected by instructions 331 in the software 333 that are carried out within the computer system 300. The software instructions 331 may be formed as one or more code modules, each for performing one or more particular tasks. The software may also be divided into two separate parts, in which a first part and the corresponding code modules perform the video object fragmentation detection methods and a second part and the corresponding code modules manage a user interface between the first part and the user.

The software 333 is generally loaded into the computer system 300 from a computer readable medium, and is then typically stored in the HDD 310, as illustrated in FIG. 3A, or the memory 306, after which the software 333 can be executed by the computer system 300. In some instances, the application programs 333 may be supplied to the user encoded on one or more CD-ROMs 325 and read via the corresponding drive 312 prior to storage in the memory 310 or 306. Alternatively, the software 333 may be read by the computer system 300 from the networks 320 or 322 or loaded into the computer system 300 from other computer readable media. Computer readable storage media refers to any storage medium that participates in providing instructions and/or data to the computer system 300 for execution and/or processing. Examples of such storage media include floppy disks, magnetic tape, CD-ROM, a hard disk drive, a ROM or integrated circuit, USB memory, a magneto-optical disk, or a computer readable card such as a PCMCIA card and the like, whether or not such devices are internal or external of the computer module 301. Examples of computer readable transmission media that may also participate in the provision of software, application programs, instructions and/or data to the computer module 301 include radio or infra-red transmission channels, as well as a network connection to another computer or networked device, and the Internet or Intranets including e-mail transmissions and information recorded on Websites and the like.

The second part of the application programs 333 and the corresponding code modules mentioned above may be executed to implement one or more graphical user interfaces (GUIs) to be rendered or otherwise represented upon the display 314. Through manipulation of typically the keyboard 302 and the mouse 303, a user of the computer system 300 and the application may manipulate the interface in a functionally adaptable manner to provide controlling commands and/or input to the applications associated with the GUI(s). Other forms of functionally adaptable user interfaces may also be implemented, such as an audio interface utilizing speech prompts output via the loudspeakers 317 and user voice commands input via the microphone 380.

FIG. 3B is a detailed schematic block diagram of the processor 305 and a "memory" 334. The memory 334 represents a logical aggregation of all the memory devices (including the HDD 310 and semiconductor memory 306) that can be accessed by the computer module 301 in FIG. 3A.

When the computer module 301 is initially powered up, a power-on self-test (POST) program 350 executes. The POST program 350 is typically stored in a ROM 349 of the semiconductor memory 306. A program permanently stored in a hardware device such as the ROM 349 is sometimes referred to as firmware. The POST program 350 examines hardware within the computer module 301 to ensure proper functioning, and typically checks the processor 305, the memory (309, 306), and a basic input-output systems software (BIOS) module 351, also typically stored in the ROM 349, for correct operation. Once the POST program 350 has run successfully, the BIOS 351 activates the hard disk drive 310. Activation of the hard disk drive 310 causes a bootstrap loader program 352 that is resident on the hard disk drive 310 to execute via the processor 305. This loads an operating system 353 into the RAM memory 306 upon which the operating system 353 commences operation. The operating system 353 is a system level application, executable by the processor 305, to fulfil various high level functions, including processor management, memory management, device management, storage management, software application interface, and generic user interface.

The operating system 353 manages the memory (309, 306) in order to ensure that each process or application running on the computer module 301 has sufficient memory in which to execute without colliding with memory allocated to another process. Furthermore, the different types of memory available in the system 300 must be used properly so that each process can run effectively. Accordingly, the aggregated memory 334 is not intended to illustrate how particular segments of memory are allocated (unless otherwise stated), but rather to provide a general view of the memory accessible by the computer system 300 and how such is used.

The processor 305 includes a number of functional modules including a control unit 339, an arithmetic logic unit (ALU) 340, and a local or internal memory 348, sometimes called a cache memory. The cache memory 348 typically includes a number of storage registers 344-346 in a register section. One or more internal buses 341 functionally interconnect these functional modules. The processor 305 typically also has one or more interfaces 342 for communicating with external devices via the system bus 304, using a connection 318.

The application program 333 includes a sequence of instructions 331 that may include conditional branch and loop instructions. The program 333 may also include data 332 which is used in execution of the program 333. The instructions 331 and the data 332 are stored in memory locations 328-330 and 335-337 respectively. Depending upon the relative size of the instructions 331 and the memory locations 328-330, a particular instruction may be stored in a single memory location as depicted by the instruction shown in the memory location 330. Alternatively, an instruction may be segmented into a number of parts each of which is stored in a separate memory location, as depicted by the instruction segments shown in the memory locations 328-329.

In general, the processor 305 is given a set of instructions which are executed therein. The processor 305 then waits for a subsequent input, to which it reacts to by executing another set of instructions. Each input may be provided from one or more of a number of sources, including data generated by one or more of the input devices 302, 303, data received from an external source across one of the networks 320, 322, data retrieved from one of the storage devices 306, 309 or data retrieved from a storage medium 325 inserted into the corresponding reader 312. The execution of a set of the instructions may in some cases result in output of data. Execution may also involve storing data or variables to the memory 334.

The video object fragmentation detection arrangements disclosed herein use input variables 354, which are stored in the memory 334 in corresponding memory locations 355-358. The video object fragmentation detection arrangements produce output variables 361, which are stored in the memory 334 in corresponding memory locations 362-365. Intermediate variables may be stored in memory locations 359, 360, 366 and 367.

The register section 344-346, the arithmetic logic unit (ALU) 340, and the control unit 339 of the processor 305 work together to perform sequences of micro-operations needed to perform "fetch, decode, and execute" cycles for every instruction in the instruction set making up the program 333. Each fetch, decode, and execute cycle comprises:

(a) a fetch operation, which fetches or reads an instruction 331 from a memory location 328;

(b) a decode operation in which the control unit 339 determines which instruction has been fetched; and (c) an execute operation in which the control unit 339 and/or the ALU 340 execute the instruction.

Thereafter, a further fetch, decode, and execute cycle for the next instruction may be executed. Similarly, a store cycle may be performed by which the control unit 339 stores or writes a value to a memory location 332.

Each step or sub-process in the processes of FIGS. 4 to 21 is associated with one or more segments of the program 333, and is performed by the register section 344-347, the ALU 340, and the control unit 339 in the processor 305 working together to perform the fetch, decode, and execute cycles for every instruction in the instruction set for the noted segments of the program 333.

The method of detecting video object fragmentation may alternatively be implemented in dedicated hardware such as one or more integrated circuits performing the functions or sub functions of extending a spatial representation, forming an extended spatial representation, and determining an extended spatial representation. Such dedicated hardware may include graphic processors, digital signal processors, or one or more microprocessors and associated memories, or a camera incorporating one or more of these components.

[Video Object Fragmentation Detection (VOFD)]

Disclosed herein is a Video Object Fragmentation Detection (VOFD) method that provides a method for computing a matching similarity between a spatial representation of a detection and an expectation. In one arrangement, the VOFD method is applied once for each pairing of a detection and an expectation. Thus, when the extraction process returns multiple detections, or where the tracker maintains multiple tracks, or both, the VOFD method is applied multiple times for a single video frame. The VOFD method is used to determine if a detection might be a fragment of an expectation. Detections identified by the VOFD method are called potential fragments. The VOFD method can be repeatedly applied to compile a list of detections that are potential fragments for every expectation.

Figure 4:
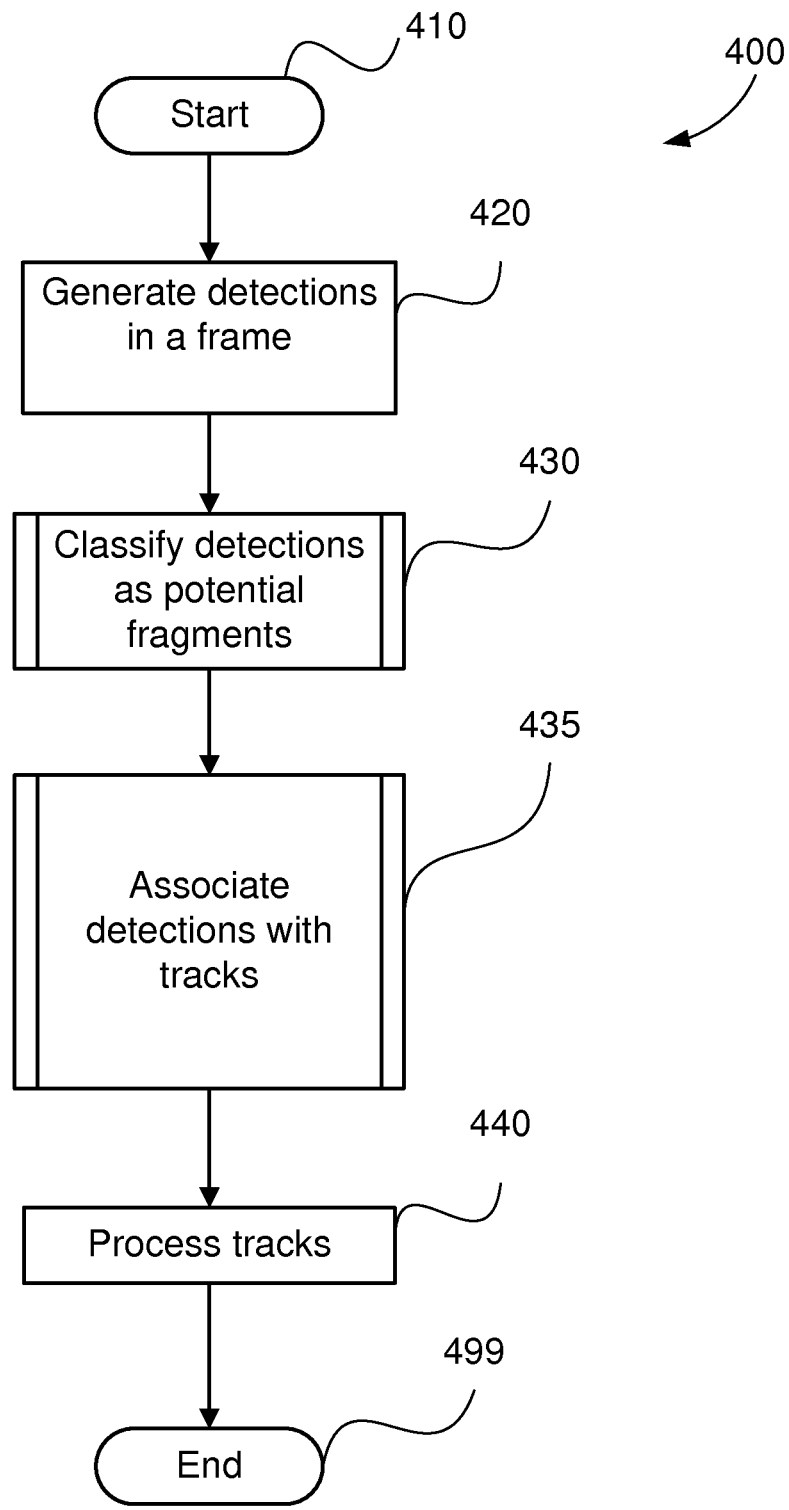
FIG. 4 is a flow diagram that illustrates functionality of an embodiment of the video object fragmentation detection method in the context of a video object tracking system.

FIG. 4 is a flow diagram 400 of a general embodiment of the VOFD method. Processing starts at step 410 and proceeds to step 420, which activates a detection generation module to generate detections in a frame. For example, the detection generation module may utilize a foreground separation method using background modelling to generate the detections. These detections are passed to a detection classifier in step 430, which classifies detections as potential fragments of a tracked object. The detection classifier 430 then feeds detections to the data association module, which in step 435 relates detections to a set of existing object tracks and updates the object tracks accordingly. The data association module in step 435 also handles remaining detections and existing object tracks that could not be associated or updated. The tracks formed by the data association module in step 435 are processed in step 440. In one arrangement, processing of the tracks in step 440 involves outputting the tracks from the system. In one implementation, for example, the tracks are output to an application that counts the number of people in a field of view. In another arrangement, processing of the tracks in step 440 involves writing the track information to a database for later querying. In yet another arrangement, processing of the tracks in step 440 displays the track information as an overlay on top of the video data. The track information can include, for example, the position and size information of detections associated with the track. The process ends at step 499 when the tracks have been processed. The foreground separation detection steps and the tracking can be executed on a single processor or a set of processors.

Figure 5:
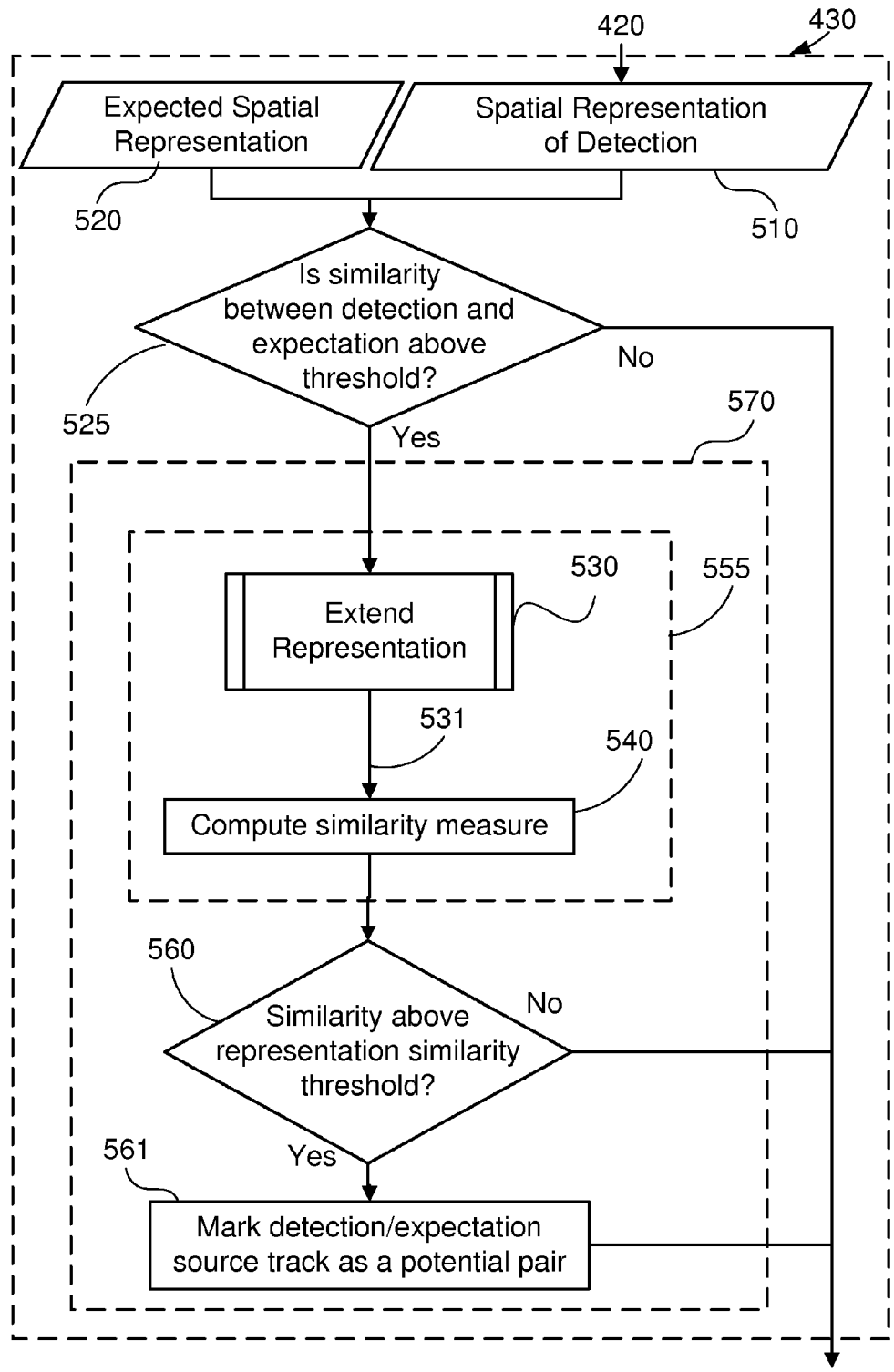
FIG. 5 is a flow diagram that illustrates functionality of a data processing architecture according to an embodiment of the fragment classification aspect of the video object fragmentation detection method.

FIG. 5 is a flow diagram providing further details of the step 430 from process 400 in FIG. 4. The detection classifier 430 receives as inputs an expectation 520 and a spatial representation of the detection 510. In one arrangement, the spatial representation of the detection 510 is the height, width and position of the detection, and the expectation 520 is also spatially represented by a height, width and position. The expectation 520 is associated with a source track from which the expectation was computed.

In one arrangement, a tracker utilizes the source track to produce the expectation from previous frames of the same sequence. In another arrangement, the tracker utilizes the source track to produce the expectation from video frames of a different sequence with an overlapping or nearby view, for example captured by another camera. In yet another arrangement, the tracker utilizes the source track to produce the expectation from other inputs, such as, for example, a door sensor, and a heuristic measure (e.g., 5 seconds after the door sensor was activated).

In one arrangement, an initial spatial similarity test 525 is performed to determine whether the detection with spatial representation 510 could possibly be associated with the expectation's source track. In one arrangement, the initial spatial similarity test 525 computes the distance between the centre of the spatial representation of the detection 510 and the centre of the expectation 520. If the distance is larger than a direct association threshold, then the detection cannot be associated with the expectation's source track and so the detection is not processed further and control passes to step 435 of FIG. 4. In one arrangement, the direct association threshold is predetermined and may be, for example, 20 blocks or 150 pixels. In another arrangement, the direct association threshold is calculated as a percentage, for example 50%, of the length of the longest dimension of the video frame. In another arrangement of determining association with the expectation's source track, the initial spatial similarity test 525 computes an area of overlap between the detection 510 and the expectation 520. If the ratio of the area of overlap to the total area of the detection 510 and the expectation 520 combined is less than a threshold, for example 0.5, then the detection is not processed further and control passes to step 435 of FIG. 4. Computation time is saved because this detection will not later be processed as a potential fragment for the source track of the expectation. If the similarity measure in step 525 "exceeds" the direct association threshold, by the computed distance being smaller than or equal to the predetermined direct association threshold or by the ratio of the area of overlap to the total area of the detection 510 and the expectation 520 combined being less than the threshold, control passes from step 525 to step 530 and a spatial representation expansion module is invoked.

The extend step 530 expands the spatial representation of the detection 510 in order to make the spatial representation of the detection 510 more similar to the expectation 520. Thus, the spatial representation expansion module 530 determines an extended spatial representation of the detection 531 using the two inputs 510 and 520. In one arrangement, the extended spatial representation of the detection 531 is given as a bounding box with a top-left corner, width and height. With the extended spatial representation of the detection 531 thus obtained, control passes to an extended similarity computation step 540 to determine a similarity measure between the extended spatial representation 531 and the original expectation 520.

Control then passes to the representation threshold decision step 560 to determine whether the similarity measure computed in the extended similarity computation step 540 meets or exceeds a fragment similarity threshold. If Yes, control passes to step 561, which marks the expectation's source track/detection 510 pair as a potential fragment of the source track of the expectation 520. However, if at step 560 the similarity measure is not above a fragment similarity threshold, No, control passes to step 435 of FIG. 3. Thus, the detection 510 is classified as a true positive for the expectation 520 if the computed similarity measure is greater than the fragment similarity threshold; otherwise if the computed similarity measure is less than or equal to the fragment similarity threshold, the detection 510 is classified as a false positive for the expectation 520.

Thus, the detection 510 is classified as a potential fragment of the expectation 520, if the computed similarity measure using the extended spatial representation of the detection is better than the fragment similarity threshold; otherwise, if the computed similarity measure is worse than or equal to the fragment similarity threshold, the detection 510 is not considered as a potential fragment for the expectation 520.

Figure 6:
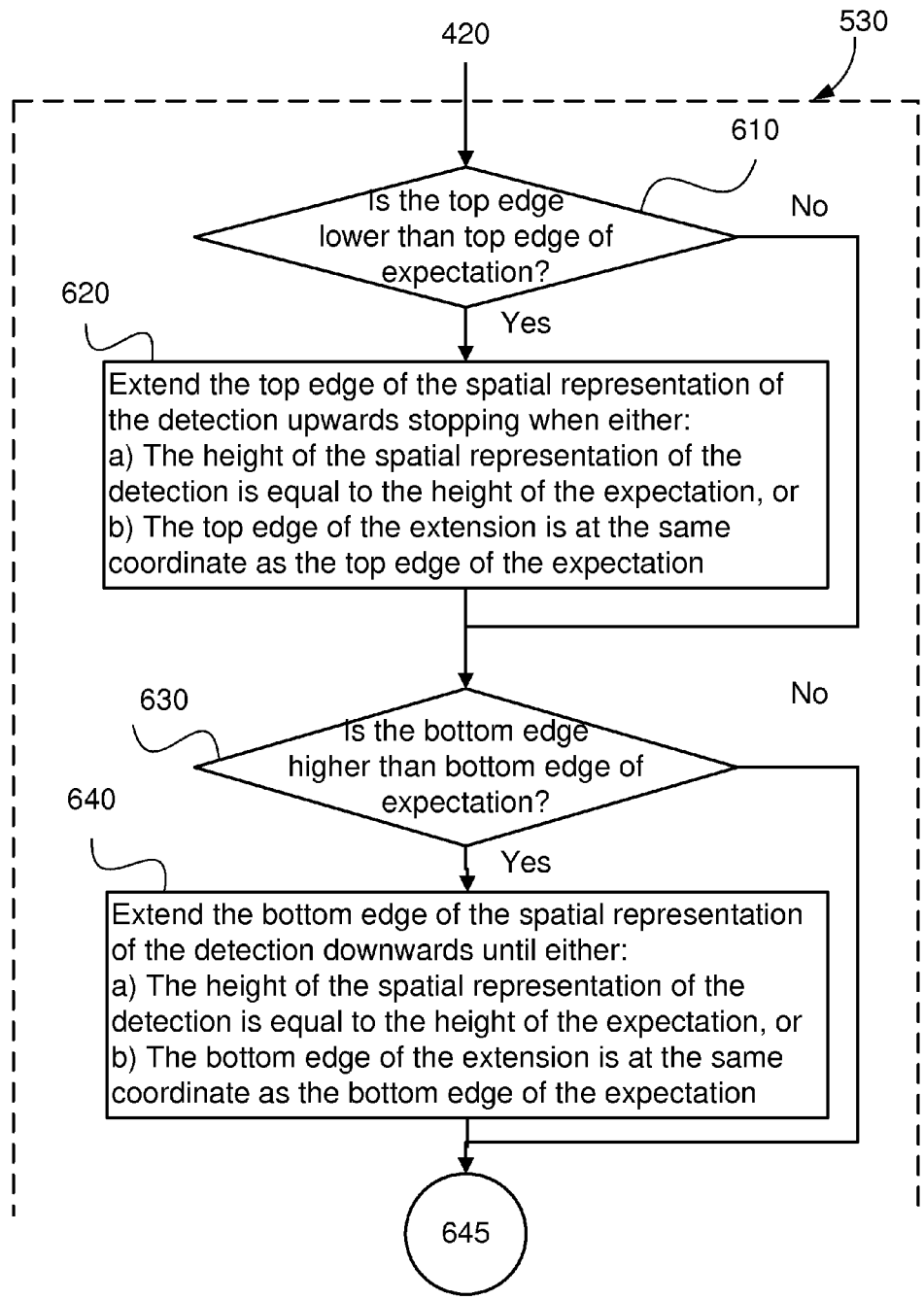
FIG. 6 is a flow diagram of an embodiment of the functionality of a spatial representation expansion module used to generate the extended spatial representation of a detection used as part of the video object fragmentation detection method.
Figure 6:
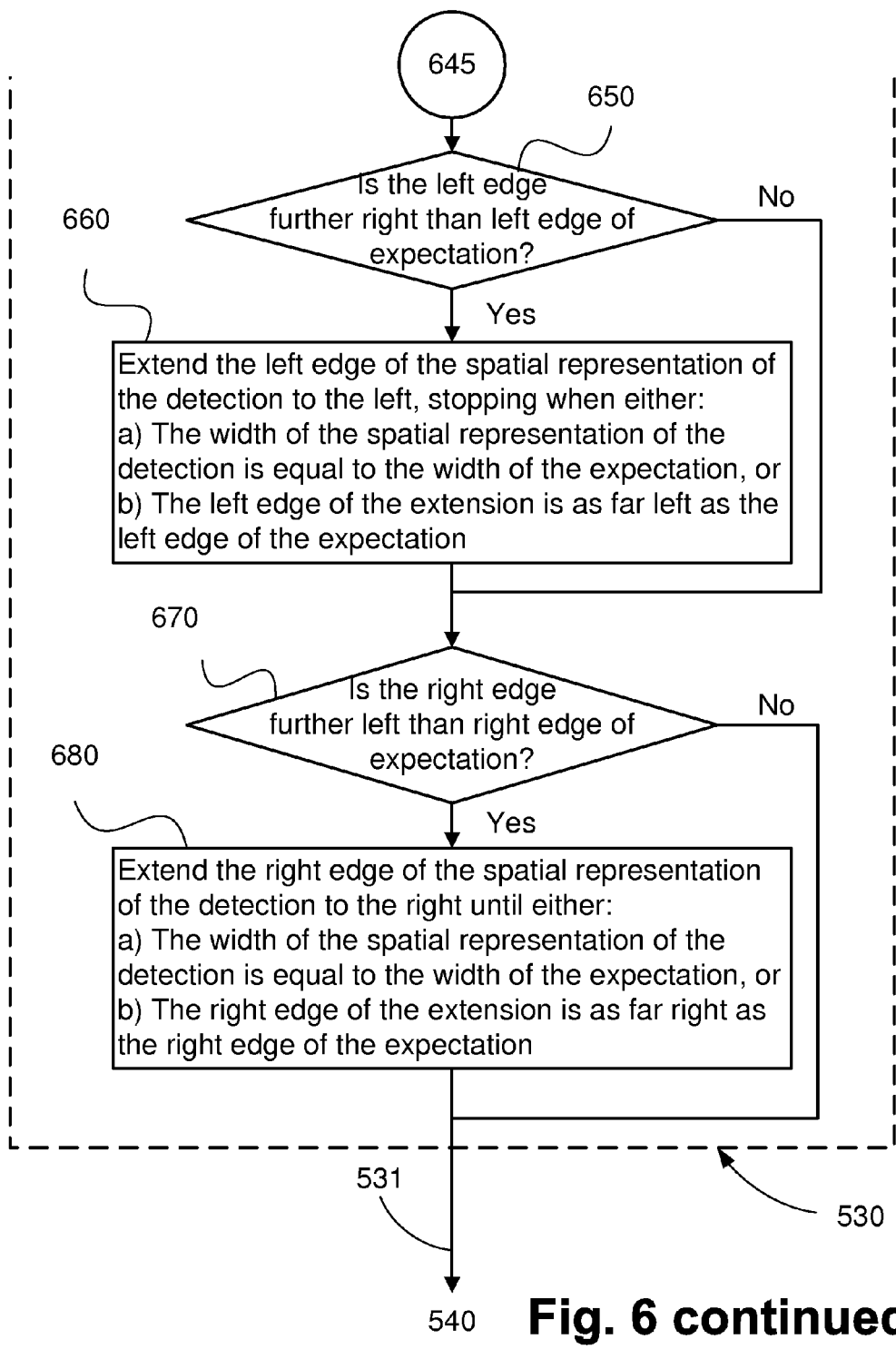

FIG. 6 is a flow diagram providing further details of the extend step 530 from FIG. 5, as performed by the spatial representation expansion module to create the extended representation 531. The extend step determines an extended spatial representation of the detection. Initially, the bounding box for the extended spatial representation of the detection (herein the extended representation) is set to be the same as the bounding box for the spatial representation of the detection 510. The bounding box for the extended representation will be extended to be similar to the expectation 520.

A top edge check 610 is performed to determine whether the top edge should be extended. If the top edge is not lower than a top edge of expectation, No, control passes to decision step 630, which is described below. However, if the top edge is lower than a top edge of expectation, Yes, control passes to extending step 620, which invokes a top edge extension module. The top edge extension module in extending step 620 extends upwards the bounding box of the spatial representation of the detection 510, such that the extended representation 531 does not grow taller than the expectation 520, and does not extend to a higher point. Control then passes to decision step 630, which performs a bottom edge check to determine whether the bottom edge should be extended. If the bottom edge is not higher than a bottom edge of the expectation, No, control passes to step 645. However, if at step 630 the bottom edge is higher than a bottom edge of the expectation, Yes, control passes to step 640, which invokes a bottom edge extension module to extend downwards the bounding box of the spatial representation of the detection 510. This prevents the extended representation 531 from growing taller than the expectation 520, and from extending to a lower point.

Checking step 650 performs a left edge check to determine whether the left edge should be extended. If the left edge is not further right than a left edge of the expectation, No, control passes to checking step 670. However, if the left edge is further right than the left edge of the expectation, Yes, control passes to step 660, which invokes a left edge extension module 660 to extend the bounding box of the spatial representation of the detection 510 to the left, such that the extended representation 531 does not grow wider than the expectation 520, and does not extend to a point farther left than the left edge of the expectation.

Checking step 670 performs a right edge check 670 to determine whether the right edge should be extended. If the right edge is not further left than a right edge of the expectation, No, control return to step 540 of FIG. 5. However, if the right edge is further left than the right edge of the expectation, Yes, control passes to step 680, which invokes a right edge extension module to extend the bounding box of the spatial representation of the detection 510 to the right, such that the extended representation 531 does not grow wider than the expectation 520, and does not extend to a point farther right than the right edge of the expectation.

Figure 7:
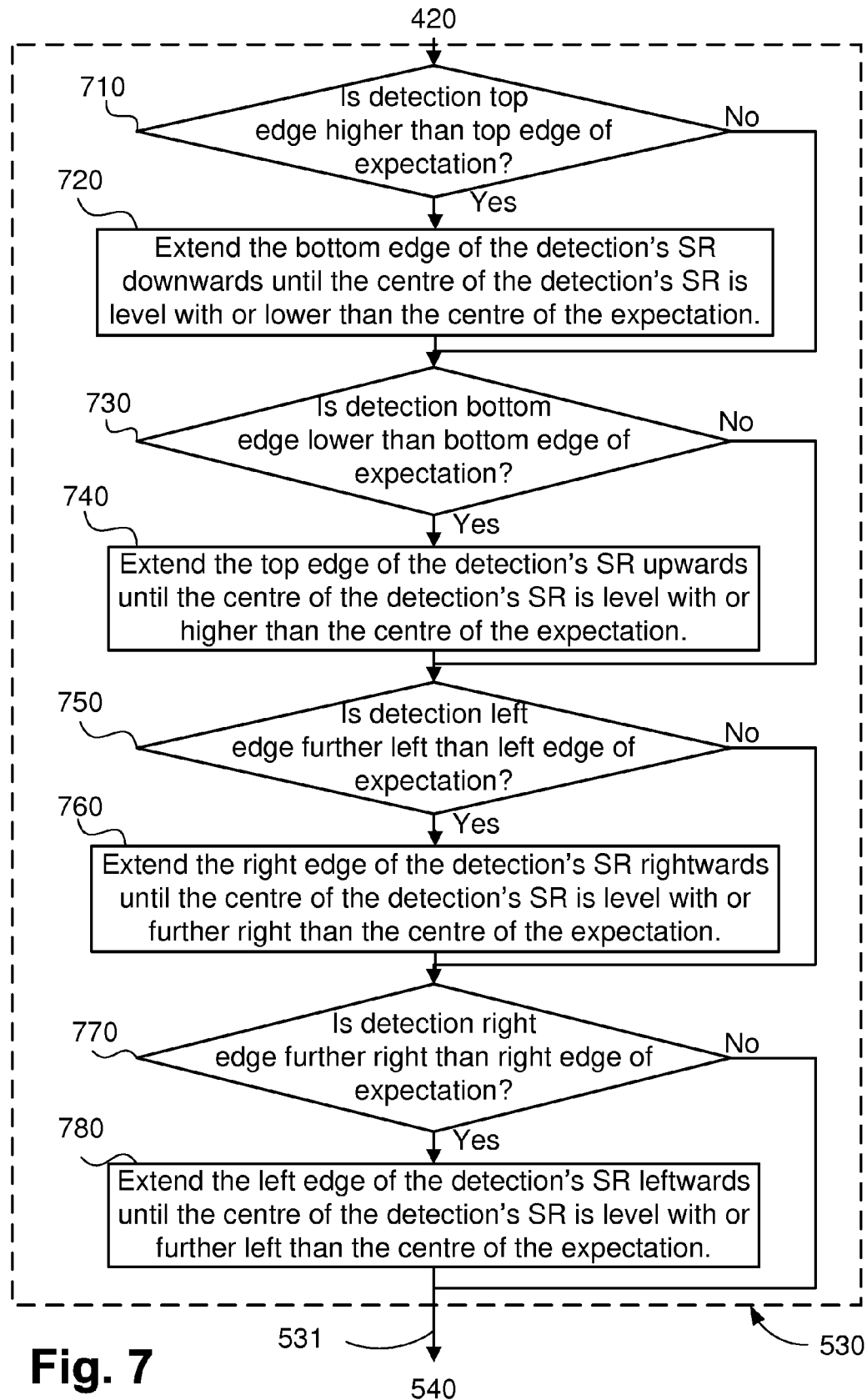
FIG. 7 is a flow diagram of an embodiment of the functionality of a spatial representation expansion module used to generate the extended representation used as part of the video object fragmentation detection method.

FIG. 7 is a flow diagram providing further detail of an alternative implementation of the step 530 from FIG. 5 and the manner by which the spatial representation expansion module creates an alternative extended representation 531.

A top edge check 710 determines whether the top edge of the spatial representation of the detection is higher than the top edge of the expectation. If Yes, control passes to extending step 720, which invokes a bottom edge extension module to extend the bounding box of the spatial representation of the detection 510 downwards, such that the centre of the bounding box of the spatial representation of the detection 510 lines up with the centre of the bounding box of the expectation 520. Control then passes to checking step 730. If at checking step 710 it is determined that the detection top edge is not higher than the top edge of the expectation, No, control passes to checking step 730 without going through the extending step 720.

Checking step 730 performs a bottom edge check to determine whether the bottom edge of the spatial representation of the detection is lower than the bottom edge of the expectation. If Yes, control passes to extending step 740, which invokes a top edge extension module 740 to extend the bounding box of the spatial representation of the detection 510 upwards, such that the centre of the bounding box of the detection 510 lines up with the centre of the bounding box of the expectation 520. Control then passes to decision step 750. However, if at checking step 730 it is determined that the detection bottom edge is not lower than the bottom edge of the expectation, No, control passes to decision step 750 without going through extending step 740.

Checking step 750 performs a left edge check to determine whether the left edge of the spatial representation of the detection is further left than the left edge of the expectation. If Yes, control passes to extending step 760, which invokes a right edge extension module to extend the bounding box of the spatial representation of the detection 510 rightwards, such that the centre of the bounding box of the spatial representation of the detection 510 lines up with the centre of the bounding box of the expectation 520. Control then passes to checking step 770. However, if at checking step 750 it is determined that the detection left edge is not further left than the left edge of the expectation, No, control passes to checking step 770 without extending 760 the right edge.

Checking step 770 performs a right edge check to determine whether the right edge of the spatial representation of the detection is further right than the right edge of the expectation. If Yes, control passes to step 780, which invokes a left edge extension module to extend the bounding box of the spatial representation of the detection 510 rightwards, such that the centre of the bounding box of the spatial representation of the detection 510 lines up with the centre of the bounding box of the expectation 520. The extended representation 531 is then passed to step 550 of FIG. 5. Returning to checking step 770, if the detection right edge is not further right than the right edge of the expectation, No, there is no need for extending the bounding box rightwards and the process returns the extended representation to computing step 540 of FIG. 5.

The effect of these changes is that the extended representation 531 created by the process illustrated in FIG. 7 has the property of being equal to or larger in size than the expectation 520. The extended representation 531 also has the same or a similar centre coordinate as the expectation 520. When the centre of an extended representation coincides with the centre of the expectation, there is a computational benefit in omitting the x- and y-components of the distance during calculation.

Figure 8A:
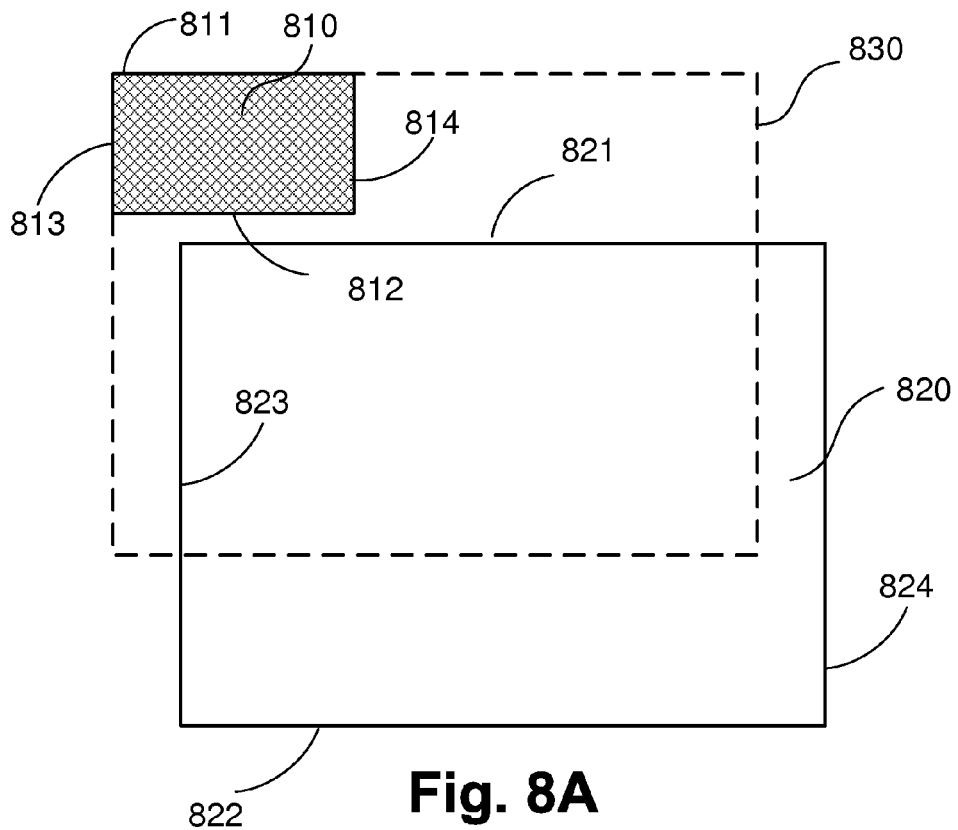
FIG. 8A and FIG. 8B are schematic representations that illustrate the application of the video object fragmentation detection method to spatial representations of detections in order to generate extended spatial representations.

FIG. 8A illustrates an example of applying the extend step 530 to a spatial representation of the detection 510 to produce an extended spatial representation 531 via the arrangement given in FIG. 6. In FIG. 8A, one example of a spatial representation of a detection 510 is given by the box with cross-hatched shading 810, and an equivalent example of an expectation 520 is represented by the solid-bordered box 820. Note that this example of a spatial representation of the detection 810 is much smaller than the expected spatial representation 820. After processing by the spatial representation expansion module 530, the extended spatial representation of the detection 830 is produced, illustrated by a dashed box 830. Note that the top edge of the spatial representation of the detection 811 is not lower than the top edge of the expectation 821 and hence is not modified according to decision 610. Thus, the process 620 is not performed in this example. However, the bottom edge of the spatial representation of the detection 812 is higher than the bottom edge of the expectation 822 and hence is extended downwards according to the extending process 640. The left edge of the spatial representation of the detection 813 and the right edge of the spatial representation of the detection 814 are processed similarly. The left edge of the spatial representation of the 813 is not modified according to decision 710 because the left edge of the spatial representation of the detection 813 is not further right than the expectation left edge 823. The right edge of the spatial representation of the detection 814 is to the left of the expectation right edge 824 and hence is extended according to the extending process 740. The dashed box 830 illustrates the extended spatial representation of the detection produced by the spatial representation expansion module 530.

Figure 8B:
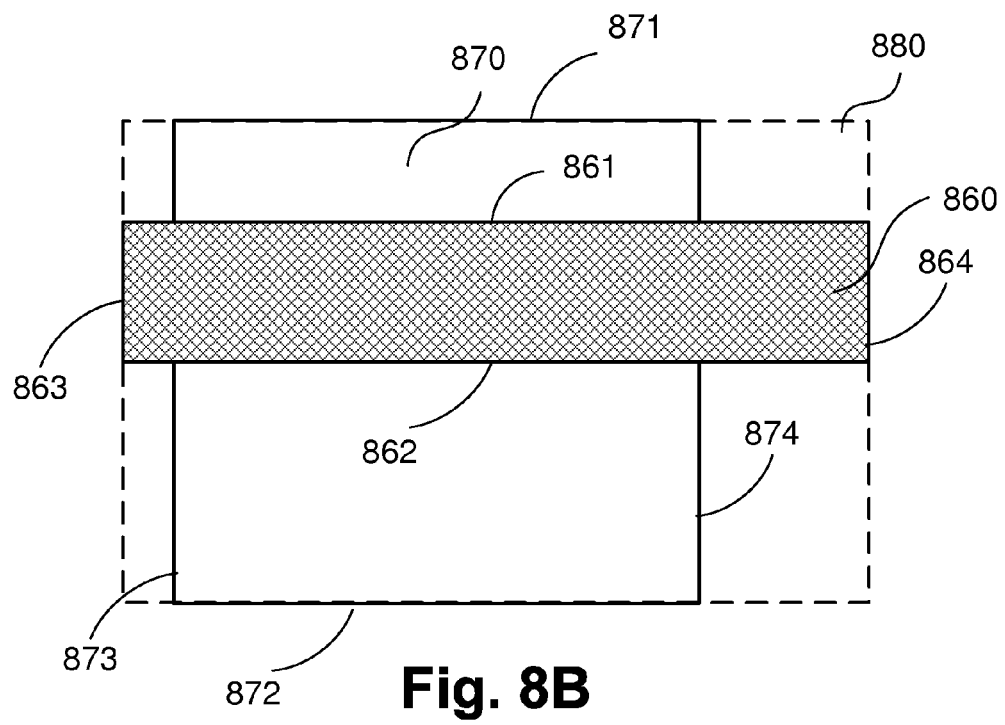

FIG. 8B illustrates a second example of applying the spatial representation expansion module 530 to the spatial representation of a detection. In this case, the example of the spatial representation of the detection 860 is larger than the example of the expectation 870 in the horizontal dimension. According to the extending process 620, the top edge of the spatial representation of the detection 861 is extended upwards until the top edge of the spatial representation of the detection 861 matches the expectation top edge 871. The process 640 is invoked via the decision 630. Extending process 640 extends the bottom edge of the spatial representation of the detection 862 downwards until the bottom edge of the spatial representation of the detection 862 matches the expectation bottom edge 872. However, because the left edge of the spatial representation of the detection 863 is not to the right of the expectation left edge 873, the decision 710 results in "no" and the process 720 is not executed. Similarly, the right edge of the spatial representation of the detection 864 is not to the left of the expectation right edge 874, thus the decision 730 results in "No" and the process 740 is not executed. The result of these extensions is the extended representation indicated by the dashed box 880.

The example in FIG. 8B demonstrates that a detection with a spatial representation larger than the expectation in one dimension remains the same size in the same dimension. Secondly, a detection with a spatial representation that is larger than the expectation in one dimension is still expanded in the dimension in which the detection is smaller than the expectation. Thus, the spatial representation expansion module 530 only extends the spatial representations of the input detections and does not reduce in size the spatial representations of the input detections. Performing extension of the spatial representations of the input detections corresponds with the VOFD method assumption that video object fragmentation results in detections with spatial representations that are smaller than the expectation. The expansion performed by the extend step 530 also allows for the evaluation of detections with spatial representations larger than the expectation 520.

As a further example, the extend step 530 can be applied to detections that are located near to, or on, the border of the video frame. Detections located near to, or on, the border of a video frame may be fragments of a larger object, part of which is located outside the field of view of the camera. In this case, the expansion performed by the extend step 530 may result in one or more edges of the extended representation being outside of the boundary of the frame. This is not a problem. In fact, the expansion provides a more accurate representation of the size and position of the object for tracking.

In yet another embodiment, the extend step 530 can be applied to an expected spatial representation, such as expectation 870 as shown in FIG. 8. Instead of extending one or more spatial representations of the detection 864, the left and right edges of the expectation 870 can be extended to form an extended spatial representation that is substantially similar to the extended representation indicated by the dashed box 880.

Figure 24A:
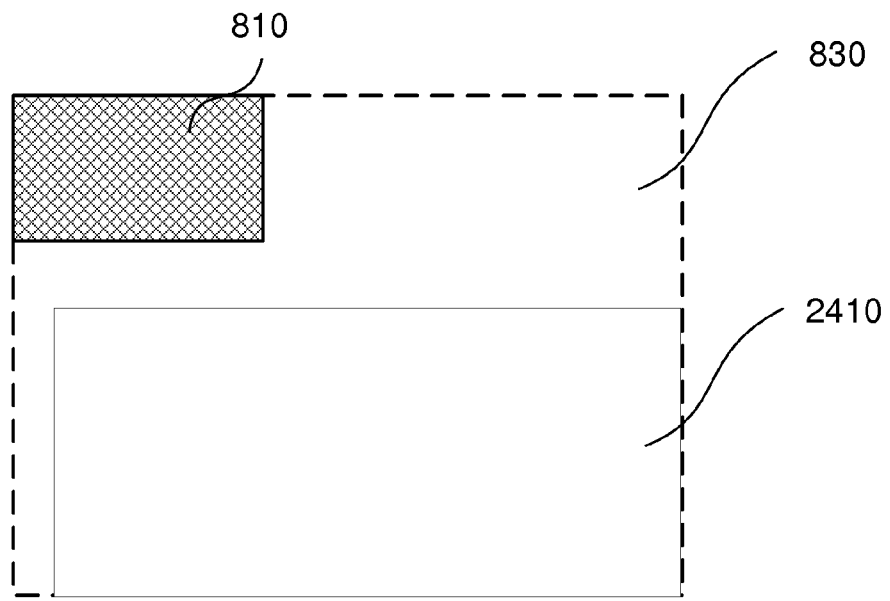
FIG. 24A and FIG. 24B are schematic lock diagram representations that illustrate extended spatial representations.
Figure 24B:
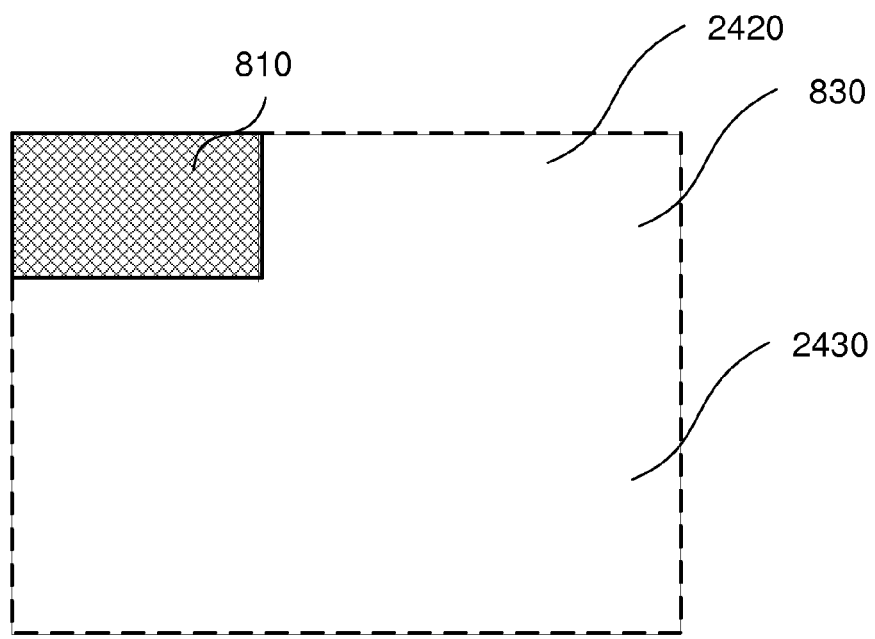

As described above with reference to FIGS. 8A and 8B, one implementation derives an extended spatial representation from a detection by extending at least one dimension of the spatial representation of the detection. Another implementation derives an extended spatial representation from a detection by augmenting a spatial representation of the detection with one or more augmenting spatial representations. The augmenting spatial representations are not other detections. Rather, the augmenting spatial representations are created to assist in defining one or more boundaries of the extended spatial representation. For example, rather than extending the spatial representation of the detection 810 of FIG. 8A to form the extended spatial representation of the detection 830, FIG. 24A shows that the extended spatial representation 830 may be formed by combining the spatial representation 810 with one augmenting spatial representation 2410 to define the boundary of the extended spatial representation 830. FIG. 24B shows that the extended spatial representation 830 may be formed by combining the spatial representation 810 with two augmenting spatial representations 2420, 2430 to define the boundary of the extended spatial representation 830. Any one or more of the augmenting spatial representations may overlap or touch one or more edges of the spatial representation of the detection 810. The augmenting spatial representations may equally not overlap or touch any edge of the spatial representation of the detection 810.

Continuing the flow in FIG. 5, the extended representation 531 created by the extend step 530 is then provided to the extended similarity computation step 540. The extended similarity computation step 540 computes a similarity measure between the extended representation 531 and the expected spatial representation 520. In one arrangement, the similarity measure is the gating distance used by a Kalman Filter based tracker. In another arrangement, the similarity measure is the gating distance used by an Alpha Beta Filter based tracker. In yet another arrangement, the similarity measure is a fraction representing the area of overlap divided by the total area occupied by the extended representation 531 and the expectation 520. In still another arrangement, the similarity measure is a sum of the discrepancies of the edge positions. In one arrangement, the similarity measure uses the same tracker used for associating detections to tracks. In another arrangement, the similarity measure uses a different tracker. The gating distance is used to track rectangular objects with four components: location (x, y) and dimension (width, height). Let the extended spatial representation 531 have coordinates (x_representation, y_representation) and dimensions (w_representation, h_representation). Similarly, let the expectation 520 have coordinates (x_expectation, y_expectation) and dimensions (w_expectation, h_expectation).

In one arrangement, the extended spatial similarity computing module 540 also receives predetermined variances as an input in order to compute the gating distance. In this arrangement, the predetermined variances are computed prior to performing the VOFD method by gathering statistics from a training set. These statistics are gathered by firstly generating detections from pre-recorded frame sequences that together form a training set. Associations are manually formed between complete, non-fragmented detections from consecutive frames of the training set. These associations are joined together temporally to form tracks. Then, for each track beginning from the third frame, an expectation is produced, for example, based on the velocity of the tracked object in the two previous frames.

The spatial representation of each expectation is compared to the corresponding spatial representation of the detection in the same frame of the training set to determine the difference of each component. Such differences may include, for example, the differences in horizontal location, vertical location, width and height. Further, the characteristics of the spatial representation, such as colour, brightness, velocity, and other visual and movement properties, can also be used to determine the differences between the expectation and the spatial representations of the detection. From these differences, statistical variances can be computed representing the error in each component. Let $\hat{x}$ denote the statistical variance of the horizontal distance between the centre of the spatial representation of the detection and the centre of the spatial representation of the expectation. In one arrangement, $\hat{x}$ is computed by first determining the difference between the horizontal location of the spatial representation of the expectation and the horizontal location of the spatial representation of the detection. This step of gathering the predetermined variances is repeated for multiple associated detections and expectations. Then, each difference is squared, and the squares are summed. Finally, the sum of the squares is divided by the number of differences. The statistical variance $\hat{y}$ of the vertical distance is computed in a similar manner, using the difference in the vertical locations. The statistical variance $\hat{w}$ of the difference in the width is computed in a similar manner, using the difference in widths. The statistical variance $\hat{h}$ of the difference in the height is computed in a similar manner, using the difference in heights.

Then, given the predetermined variances, the gating distance dist may be computed via:

$$dist = \frac{(\text{x\_representation} - \text{x\_expectation})^2}{\hat{x}} + \frac{(\text{y\_representation} - \text{y\_expectation})^2}{\hat{y}} + \frac{(\text{w\_representation} - \text{w\_expectation})^2}{\hat{w}} + \frac{(\text{h\_representation} - \text{h\_expectation})^2}{\hat{h}}$$

This gating distance function produces a numerical result which is small if the extended spatial representation 531 and the expectation 520 are similar, and large if they are dissimilar. In one arrangement, the result is converted into a similarity measure value sim, where a large similarity measure represents high similarity between the extended spatial representation 531 and the expectation 520. In one arrangement, the following transformation function is applied:

$$sim = \frac{1}{dist + 1}$$

The similarity measure sim has some important properties. Statistically, the distance between the expectation 520 and the spatial representation of a non-fragmented detection should be within approximately one standard deviation. Dividing each component's square of the difference by the variance scales the error such that the contribution to the gating distance is 1.0 unit for each component. The calculated gating distance should be less than the number of measured components (i.e., 4.0 in this arrangement), if the spatial representation of the detection corresponds to the spatial representation of the expectation 520. Thus, the similarity measure is expected to be larger than (1/(4+1))=0.2 if the spatial representation of the detection corresponds to the spatial representation of the expectation 520. Where the properties of a system have been measured to give the variances, the value of 0.2 is known to be optimal, in the Bayesian sense.

The extend step 530 and extended spatial computation step 540 together form a fragment potential measuring module 555 that determines if a detection is a potential fragment for an expectation.

The similarity measure as computed by the extended spatial similarity computing module 540 is then used in representation similarity threshold test 560. In one arrangement, if the similarity measure value is greater than a predetermined representation similarity threshold, for example 0.3, the detection 510 is marked as a potential fragment of the expectation's source track by fragment marking step 561. In another arrangement, a predetermined optimal similarity value is used, (e.g., 0.2). The potential pair will be processed further in step 1010 of FIG. 10, which is detailed below. If the similarity measure value is smaller than or equal to the representation similarity threshold, control is transferred to step 440 directly. The fragment potential measuring module 555 and the representation similarity threshold test 560 to mark the detection and the expectation's source track as a potential pair 561 together form extension classification module 570.

[Data Association]

When a tracker maintains a single track and the tracker is provided with one detection similar to the expectation generated from the single track, then associating the single detection with the single track is not controversial. When a tracker maintains a single track and the tracker is provided with a plurality of potential fragments, a combination of the plurality of potential fragments can be associated with the single track. In one implementation, it is also possible to associate a single detection with a plurality of tracks. Matching many tracks to one detection is valuable when, for example, two objects are being tracked, and one occludes the other resulting in a single detection, with the single detection being larger than either expected individual detection. A similar process to matching fragments to a track is then followed, but instead with tracks being matched against a compound object. However, a much more complex situation arises when the tracker maintains multiple tracks and is provided with multiple detections, where the multiple detections include classified potential fragments.

In one implementation, matching multiple tracks to a single detection results in the creation of a mergetrack—an additional track for the merged detection. Subsequent detections will either be associated with the individual contributor tracks of the mergetrack, or be associated with the same combination of tracks as before, or be associated with the mergetrack itself, depending on the spatial similarity scores. In one implementation, the mergetrack is discarded if the contributor tracks are subsequently tracked independently, thereby showing that a temporary occlusion had occurred. In one implementation, a mergetrack is continued when the same tracks combine repeatedly. However, if incoming detections match well with the mergetrack itself, then the corresponding contributing tracks are terminated and considered to be merged. In one implementation, a mergetrack may be associated with a plurality of detections, thereby matching many tracks to many detections, where appropriate.

Figure 9:
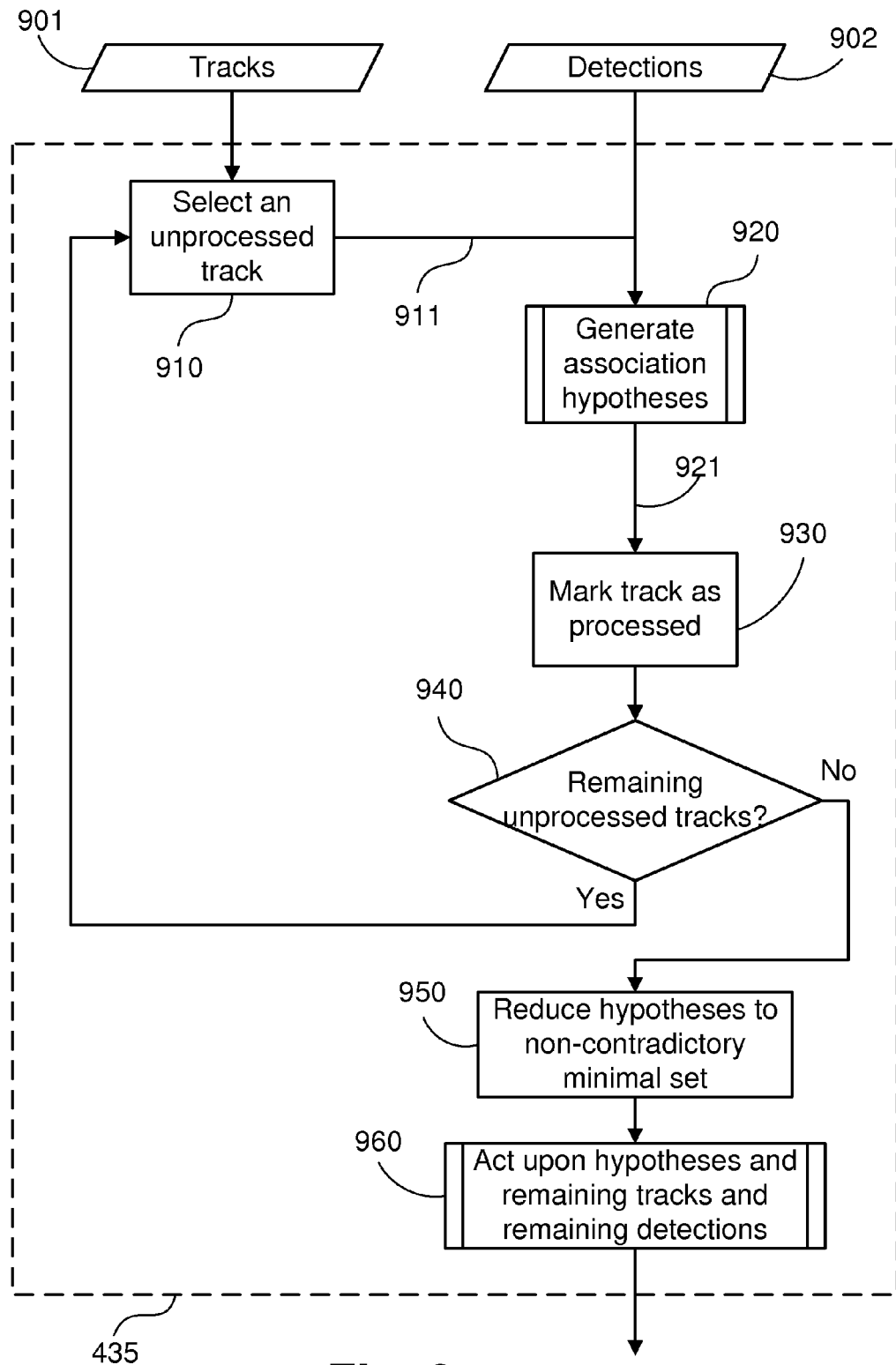
FIG. 9 is a flow diagram that illustrates functionality of a data association module that associates incoming detections with tracks maintained by a tracking system.

FIG. 9 is a flow diagram that details the steps of the data association module 435 of FIG. 4 as used in one arrangement. Data association is the method of associating detections with tracks and is performed as part of the tracker. The inputs to the data association module 435 are a set of tracks 901 managed by the tracker, and a set of detections 902. The detections 902 have already been classified in step 430 as potential pairs with a subset of the tracks 901. The procedure of associating detections to tracks first involves generating association hypotheses. Each track 911 is processed independently. Accordingly, the set of tracks 901 is presented to selecting step 910, which selects an unprocessed track 911 from the tracks 901 and delivers the unprocessed track 911 as an input to the association hypothesis generation module in step 920. The association hypothesis generation module also receives as an input the set of detections 902, and utilizes the unprocessed track 911 and the detections 902 to generate association hypotheses 921.

Figure 10:
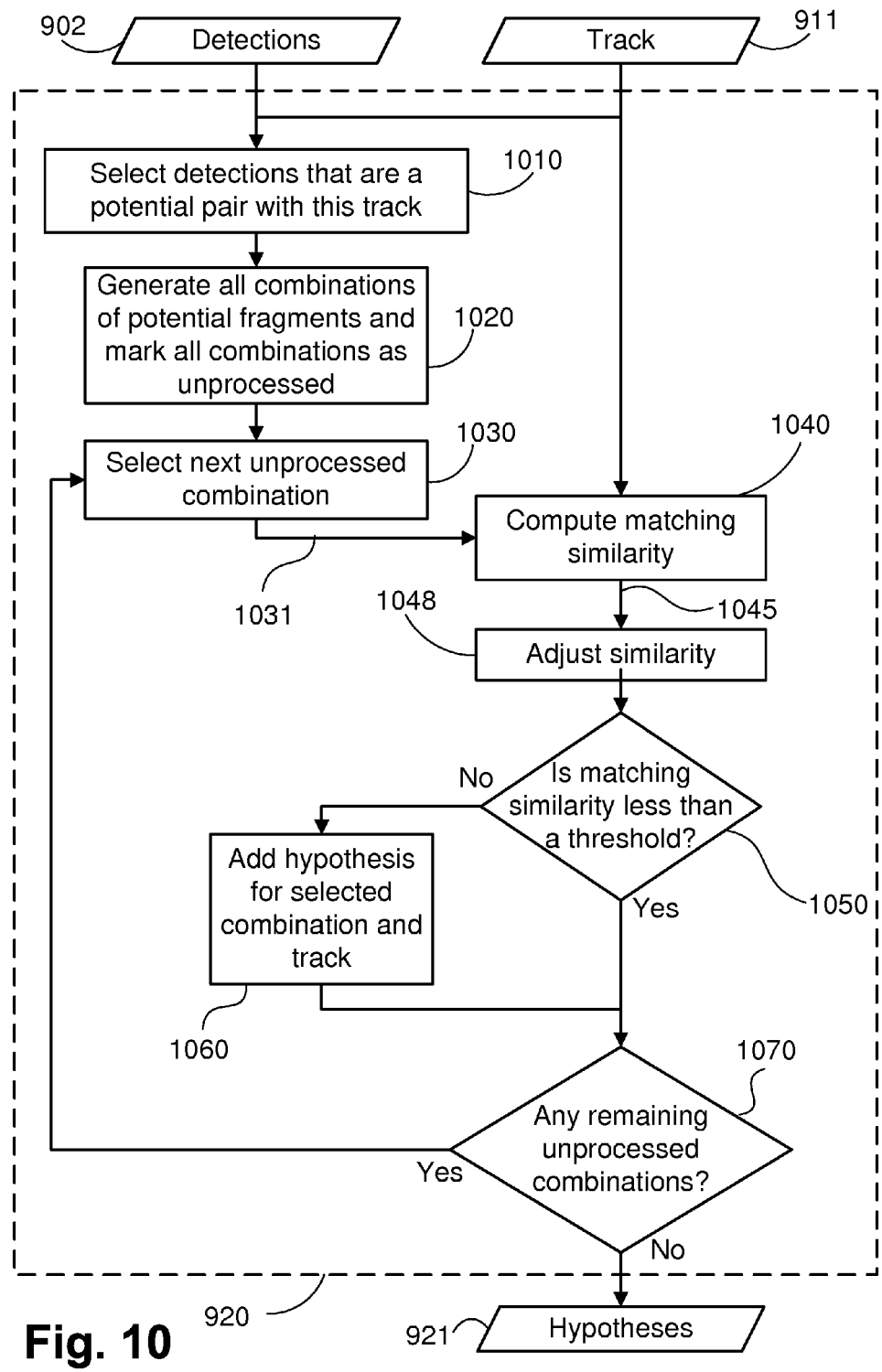
FIG. 10 is a flow diagram that illustrates functionality of one step of the association hypothesis generation module used to generate association hypotheses of combinations of incoming detections with tracks maintained by a tracking system.

FIG. 10 is a flow diagram that illustrates in detail an arrangement of the method performed by the association hypothesis generation module in generating step 920 of FIG. 9. The step 920 has two inputs: the detections 902 and the unprocessed track 911. First, in select detections step 1010, the supplied detections 902 are reduced to the set of potential fragments for the track as classified earlier. Thus, selecting step 1010 selects those detections that are a potential pair with this track 911, based on the classification of the detections in step 430 of FIG. 4. Control passes to generate combinations step 1020, which generates possible combinations of the potential fragments (henceforth: combinations). Each combination is a unique subset of the potential fragments, where the subset may contain one or more potential fragments. The subset may be an improper subset of the set of combinations. Thus, each combination represents a compound detection, that is, a detection comprising multiple potential fragments.

In another arrangement, the generate combinations step 1020 may generate all combinations of detections 901 instead of generating all combinations of potential fragments, which are a subset of the detections 901. Although this arrangement is potentially sub-optimal in terms of performance when the number of detections 901 is not small, for frames with small numbers of detections 901 it may be faster to consider all combinations of blobs in the generate combinations step 1020, rather than performing the VOFD method.

The implementation of FIG. 10 processes each combination in turn. Control passes from generating step 1020 to selecting step 1030, which selects an unprocessed combination 1031 and forwards the unprocessed combination 1031 to similarity computation step 1040, which computes a matching similarity score 1045. The similarity score 1045 is computed in step 1040 between the spatial representation of the unprocessed combination 1031 and the expected spatial representation of the track 911. In one arrangement, the similarity score 1045 is computed using the same method as used in the extended spatial similarity computing module 540. Note that the extended spatial similarity computing module of step 540 of FIG. 5 computes the similarity between an expectation 520 and a spatial representation of a detection 510. In the similarity computation step 1040, the similarity score is used to compute a similarity between a combination of potential fragments and an expectation. In other arrangements, other methods to determine the similarity measure can be used. For example, where colour histogram-based object matching is used, the Bhattacharyya distance between colour histograms can be used for, or to contribute to, the similarity measure.

In one arrangement, a minimal bounding box enclosing the combination of the spatial representations of the detections is used for computing the matching similarity in the similarity computation step 1040. In the case of a single detection, this is the bounding box of the spatial representation of the detection itself. It is emphasised that this is not the extended spatial representation of the detection 531. Once the similarity score 1045 has been computed by the similarity computation step 1040, control passes to the adjust similarity step 1048.

In one arrangement, the adjust similarity step 1048 applies a bonus to the similarity score, based on the number of detections 902 included in the combination. In one arrangement, the bonus is determined by multiplying the number of detections 902 in the combination 1031 by a scalar, and then adding the bonus to the similarity score. In another arrangement, the bonus is determined by using the number of detections 902 in the combination 1031 as an index to a matching similarity bonus lookup table, and the bonus is added to the similarity score. In yet another arrangement, the bonus is determined by using the number of detections 902 in the combination as an index to a matching similarity bonus lookup table, and the similarity score is multiplied by the bonus. In yet another arrangement, the bonus is determined by applying a formula to the number of detections 902 in the combination, and the bonus is applied to the similarity score, such as by adding the bonus to the similarity score or by multiplying the bonus by the similarity score.

In another arrangement, the adjust similarity step 1048 applies a penalty to the similarity score based on the number of potential fragments for the track that are excluded from the combination. In one arrangement, the penalty is determined by multiplying the number of potential fragments excluded from the combination by a scalar, and then adding the penalty to the similarity score. In another arrangement, the penalty is determined by using the number of potential fragments excluded from the combination as an index to a matching similarity penalty lookup table, and the penalty is added to the similarity score. In yet another arrangement, the penalty is determined by using the number of potential fragments excluded from the combination as an index to a matching similarity penalty lookup table, and the similarity score is multiplied by the penalty. In yet another arrangement, the penalty is determined by applying a formula to the number of potential fragments excluded from the combination, and the penalty is applied to the similarity score, such as by adding the bonus to the similarity score or by multiplying the bonus by the similarity score.

In another arrangement, the adjust similarity step 1048 applies a bonus to the similarity score based on the number of potential fragments for the track that are excluded from the combination.

Combinations that include a larger number of detections are given a bias, or weighting, by adjusting the similarity score based on the number of detections included within the combination. Applying a bias to combinations that include more detections reduces the number of detections that are incorrectly omitted from being associated with a track.

Consider again FIG. 2B. The detection of the first person in FIG. 2B has three fragments: a body fragment 211, a left leg fragment 212 and a right leg fragment 213. Consider the three combinations of fragments: a first combination that includes body fragment 211 and left leg fragment 212; a second combination that includes body fragment 211 and right leg fragment 213; and a third combination that includes body fragment 211, left leg fragment 212, and right left fragment 213. Consider that each combination of these fragments has the same similarity score. By adjusting the similarity score based on the number of detections, the third combination would have the best similarity score and can be easily distinguished from the first combination and the second combination.

Returning to FIG. 10, next the computed similarity score 1045 is used as input to a decision step 1050. If the similarity score is not less than a predetermined combination similarity threshold, No, control passes to step 1060 to create an association hypothesis for the combination 1031 and the track 911, and add the association hypothesis to the list of association hypotheses 921. An association hypothesis comprises at least a track 911, a combination 1031 and a similarity score 1045. Control then passes to step 1070. In one example, a similarity threshold of 0.2 is used. The actual similarity threshold used will depend on the particular application.

Returning to step 1050, if the similarity score is less than the predetermined combination similarity threshold at step 1050, then no action is taken, and thus no association hypothesis is created and association hypothesis creation step 1060 is skipped. Control then passes to step 1070. Note that the predetermined combination similarity threshold may be equal to the predetermined representation similarity threshold.

Decision step 1070 determines whether there are any remaining unprocessed combinations. If there are any remaining unprocessed combinations, Yes, control returns to step 1030 to process another unprocessed combination. However, if at step 1070 there are no more unprocessed combinations, No, the process outputs a set of hypotheses 921.

Figure 11A:
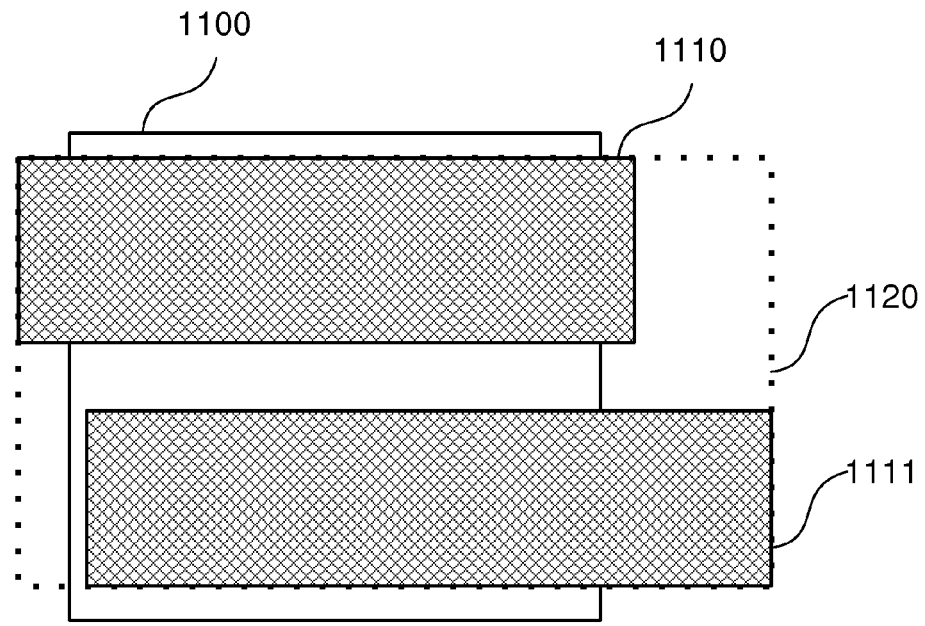
FIG. 11A and FIG. 11B are schematic representations that together illustrate examples of detections and expectations in demonstrating the application of the video object fragmentation detection method.

An example of processing combinations of fragments is provided with reference to FIG. 11A. FIG. 11A shows an expectation 1100, a first detection 1110, a second detection 1111, and a bounding box 1120. Despite being a potential fragment, the first detection 1110 by itself has a low matching similarity to the expectation 1100, because the spatial representation of the first detection 1110 is very different from the spatial representation of the expectation 1100, even though the location is similar. If it is determined in step 950 that the matching score is below the combination similarity threshold, then no association hypothesis is formed for associating the single detection 1110 to the expectation 1100. The second detection 1111 by itself might also have a low matching similarity to the expectation 1100, which is less than the combination similarity threshold, so again, no association hypothesis would be formed. However, together, the combination of the spatial representation of the first and second fragments 1110 and 1111 are enclosed by the bounding box 1120, which has a high similarity to the expectation 1100. In this case, the high matching similarity is above the combination similarity threshold and causes an association hypothesis to be formed. In one arrangement, an association hypothesis associating the source track of the expectation 1100 and the fragments 1110 and 1111 that are part of the combination is formed. In another arrangement, an association hypothesis associating the combination of fragments 1110 and 1111 and the source track of the expectation 1000 is formed.

In a process that is analogous to the combination of fragments, the combination of tracks to a single detection may also be considered. FIG. 11A shows a detection 1100, a first track 1110, and a second track 1111. Despite being a potential contributor track, the first track 1110 by itself has a low matching similarity to the detection 1100, because the spatial representation of the first track 1110 is very different from the spatial representation of the expectation 1100, even though the location is similar. The second track 1111 by itself might also have a low matching similarity to the detection 1100, which is less than the combination similarity threshold, so again, no association hypothesis would be formed. However, together, the combination of the spatial representations of the first and second tracks 1110 and 1111 are enclosed by the bounding box 1120, which has a high similarity to the detection 1100. In this case, the high matching similarity is above the combination similarity threshold and causes an association hypothesis to be formed. In one arrangement, an association hypothesis associating the detection 1100 and the tracks 1110 and 1111 that are part of the combination is formed. In another arrangement, a new track formed from tracks 1110 and 1111 is created and an association with detection 1100 is formed.

Sometimes, however, a combination of the spatial representations of potential fragments will not be valid. Consider FIG. 11B. The spatial representations of first and second detections 1160 and 1161 are each classified independently as potential fragments via their extended representations as computed by spatial representation expansion module 530. Note that a minimal bounding box 1170 enclosing the spatial representations of the detections 1160 and 1161 bears some similarity to the spatial representation of the expectation 1150. However, it is unlikely that the combination of the spatial representations of the detections 1160 and 1161 together are a match to the spatial representation of the expectation 1150. The reason for this is that the area of the minimal bounding box 1170 is far greater than the sum of the area of the spatial representations of the potential fragments 1160 and 1161 themselves.

Figure 11B:
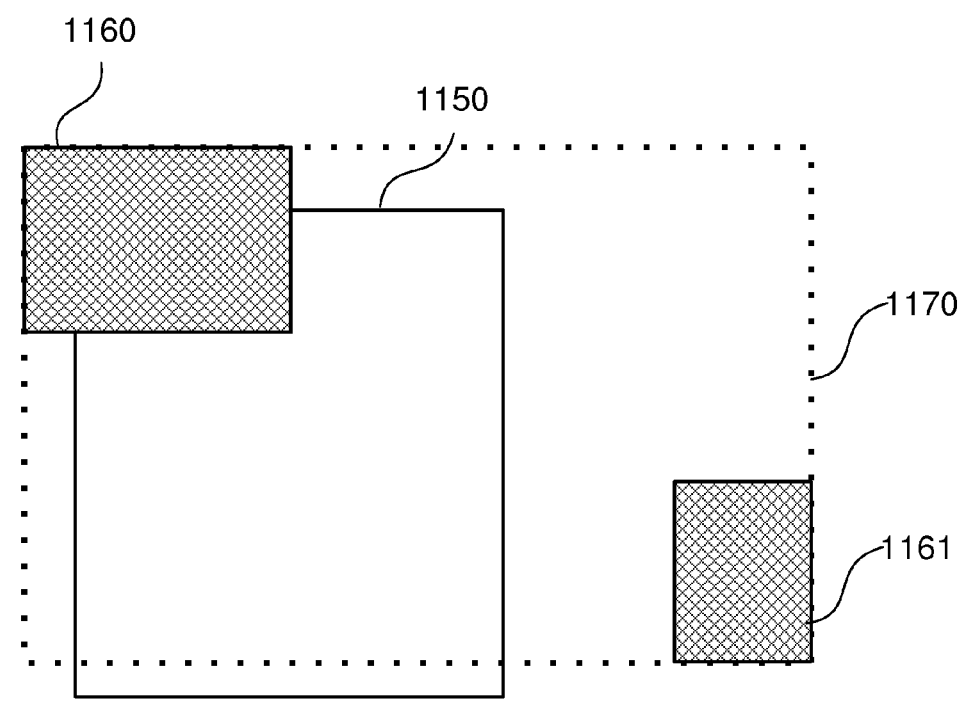

The VOFD method can be extended to allow for the application of an additional heuristic to eliminate unlikely combinations, as in FIG. 11B. In one arrangement, the heuristic is the area of the combination of the spatial representation of the potential fragments divided by the area of the minimal bounding box enclosing the combination of the spatial representation of the potential fragments. This ratio must be greater than a predetermined combination area threshold, for example 0.5, in order for the combination of potential fragments to be valid. If this area ratio is not greater than the combination area threshold, an association hypothesis is not formed. The heuristic can be applied as part of the process that computes in step 1040 the matching similarity 1045. In another arrangement, another heuristic is used. First, the area of overlap of the spatial representation of the potential fragments 1160 and 1161 with the spatial representation of the expectation 1150 is taken. Next, the area of overlap of the combination 1170 with the expectation 1150 is taken. The heuristic is the ratio of the first area with the second area. In the arrangement, the ratio of the area of overlap must be above a predetermined area overlap threshold, for example 0.5, in order for the combination of potential fragments to be valid. If the area of overlap ratio is not greater than the predetermined area overlap threshold, an association hypothesis is not formed.

A test is performed to determine whether the association hypothesis generation module 920 has further unprocessed combinations to consider 1070. If there are further unprocessed combinations to consider, a sequence of three steps is repeated. The first step is selecting a combination 1030. The second step is computing a matching similarity 1040 between the spatial representation of the combination of the fragments and the expectation 911. The third step is deciding whether to perform an action 1060 based on the matching similarity 1050.

Returning to FIG. 9, the association hypothesis generation module 920 results in a set of association hypotheses 921 being generated for combinations of detections 902 and the track 911. The track 911 has now been processed and control passes from step 920 to step 930, which marks the track 911 as having been processed. Control passes to decision step 940 to determine whether there are any remaining unprocessed tracks. If in step 940 it is determined that there are remaining tracks to be processed, Yes, the process repeats from step 910.

Upon all tracks being marked as processed, the decision step 940 determines that there are no remaining unprocessed tracks, No, and control passes to reducing step 950 which is used to process the association hypotheses 921 generated by the association hypothesis generation module 920. As the association hypotheses were generated independently for each expectation, it is possible that some association hypotheses attempt to associate the same detection (or even the same combination of detections) to different tracks. Such contradictions may be undesirable. Thus, in one arrangement the association hypothesis reduction process 950 is used to reduce the set of association hypotheses to an optimal set. In the optimal set, each detection appears in at most one association hypothesis, and where each track appears in at most one association hypothesis.

In one arrangement, the Global Nearest Neighbour (GNN) approach is used to reduce the set of association hypotheses. Global Nearest Neighbour is an iterative, greedy algorithm that, in this application, selects the association hypothesis with the highest similarity measure from the input set and places it in the optimal set. All other association hypotheses that contain the same track or any of the detections represented by the selected association hypothesis are then deleted from the input set of association hypotheses. This is because selecting them later would create contradictions. An alternative approach is to evaluate every possible combination of association hypotheses to find procedurally the optimal non-contradictory subset (according to the similarity measure). However, evaluating every possible combination of association hypotheses can be very computationally expensive. Thus, the association hypothesis reduction process 950 results in a non-contradictory subset of association hypotheses that is a subset of the association hypotheses resulting from the association hypothesis generation module 920. In the non-contradictory subset of association hypotheses, each detection appears in at most one association hypothesis and each track appears in at most one association hypothesis.

In one arrangement, the association hypothesis reduction process 950 may recalculate the similarity score for an association hypothesis at each iteration of the GNN algorithm. The size of the penalty applied to the similarity score in the adjust similarity step 1048 may change in each iteration of the GNN algorithm. This is because the number of potential fragments excluded from the association hypothesis may decrease from the previous iteration, if a potential fragment that was excluded from the association hypothesis was contained in another association hypothesis selected in a previous iteration of the algorithm. In another arrangement, the similarity score is not recalculated.

Upon completion of the association hypothesis reduction process 950 of reducing the association hypotheses to a non-contradictory subset, the tracking system updates the tracks in the association hypothesis processing module 960 and the method of FIG. 9 returns control to processing step 440 of FIG. 4.

Figure 12:
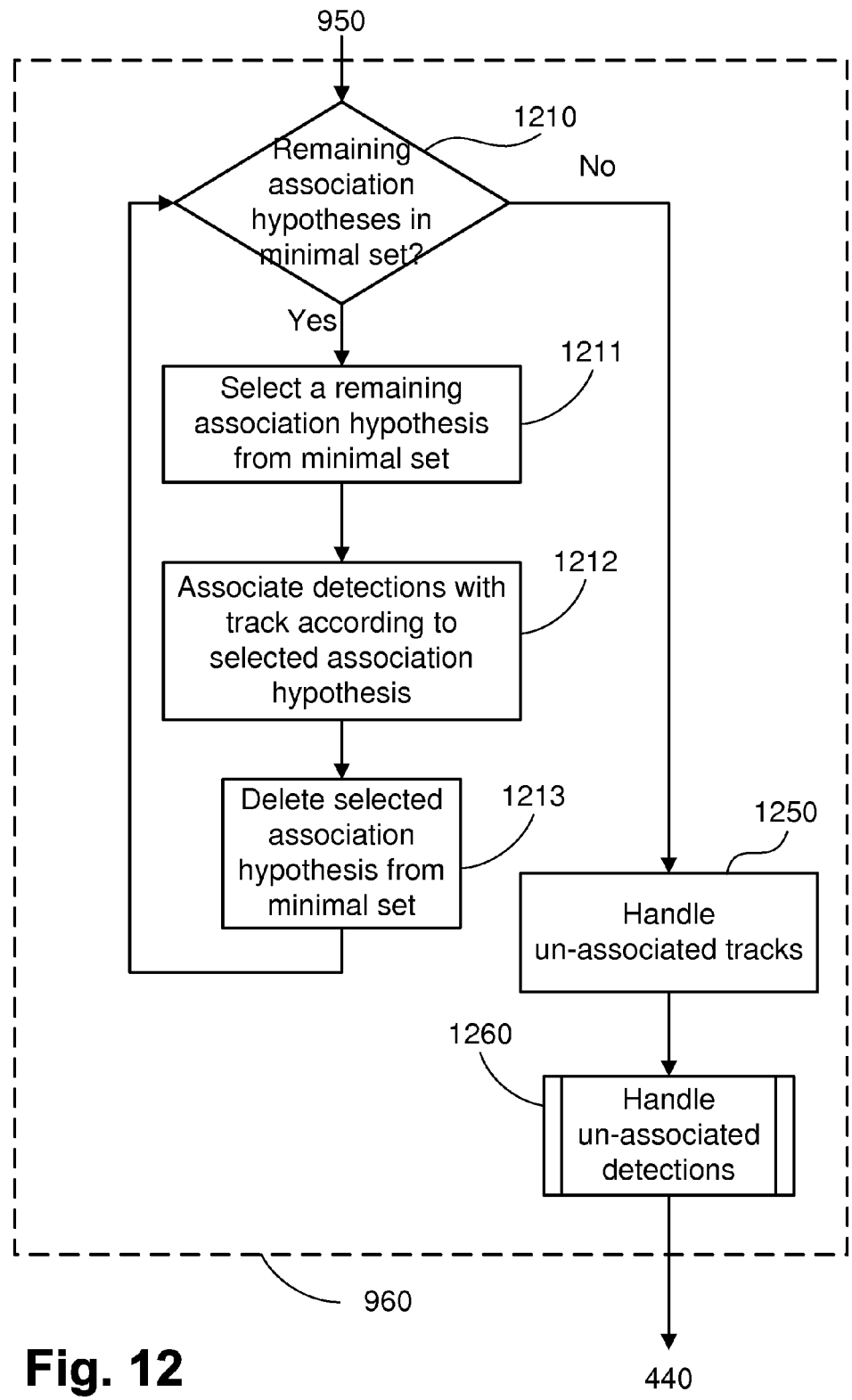
FIG. 12 is a flow diagram that illustrates functionality of one step of the association hypothesis processing module used to associate incoming detections with tracks maintained by a tracking system, according to a set of association hypotheses, and also to process remaining unprocessed tracks and remaining unprocessed detections.

FIG. 12 is a flow diagram of the hypothesis processing step 960 of FIG. 9 for handling this subset of association hypotheses, and also handles tracks and detections which are not covered by the association hypotheses. First, a test is performed to determine whether there are association hypotheses remaining in the minimal non-contradictory subset to be processed in step 1210.

Next, an association hypothesis is selected from the minimal set of non-contradictory association hypotheses 1211. Then, in detection/track association step 1212, the detections represented in the association hypothesis are associated with the track 911 represented in the association hypothesis. The selected association hypothesis is then deleted from the minimal set in association hypothesis deletion step 1213 in order to avoid duplicate associations. Upon deletion of the association hypothesis, the process returns to the decision 1210 and processes further association hypotheses if available.

[Handling Un-Associated Tracks]

There may be some remaining tracks that are not associated with any detections according to the minimal set of non-contradictory association hypotheses. Optionally, further processing can be performed on these remaining tracks. In one arrangement, the additional un-associated track processing step 1250 is executed to process any tracks which are not associated with any detections by any of the association hypotheses selected in step 1211.

In one arrangement, the tracker handles the case where a track is not associated with any detections for a number of consecutive frames. The tracker can produce expectations in later frames, until the number of consecutive frames where no detections have been associated with the track exceeds a predetermined un-associated track existence threshold, for example 5. If the un-associated track existence threshold is exceeded for a given track, the tracker will no longer attempt to associate detections with the track.

False positive detections may be made on occasion, in a manner whereby typically they are only generated for a small number of consecutive frames. In one arrangement, tracks that contain a number of associations below a predetermined false positive track length threshold, for example 5 frames, are revoked. In one arrangement, revoking means that the tracks will not be processed in future frames. In another arrangement, the tracker deletes all traces of the existence of the tracks.

[Handling Un-Associated Detections]

Similarly to the un-associated track processing step 1250, there may be some remaining detections that are not associated with any tracks according to the minimal set of association hypotheses. In one arrangement, these remaining detections are processed by the un-associated detection processing module 1260. In one arrangement, a new track is created for each remaining detection. This process is incorporated into the un-associated detection processing module 1260. In another arrangement, a new track is created only if the size of the spatial representation of a detection is above a predetermined detection size threshold. An example of the predetermined detection size threshold is 15 DCT blocks for a frame with dimensions of 96×72 blocks, or 100 pixels for a frame with dimensions 320×240 pixels. In another arrangement, the detection size threshold is a percentage, for example 0.2%, of the number of blocks or pixels in the frame.

[Backdating Objects Splitting (BOS) Method]

Sometimes, a real-world object that is being tracked splits into two objects. For example, the tracked object may be a person carrying a bag, and that person may later deposit the bag and depart without the bag. One approach for tracking in this scenario is to track the two resulting objects independently.

In a system subject to both fragmentation and splitting, combining these approaches is problematic. When following a single track, multiple extracted object locations may appear due to either object-extraction errors, or due to the genuine splitting of the real-world objects. One approach for distinguishing between these cases is based on the application of a threshold to a measure of the separation of the fragments. One measure of separation is based on the distance between the object locations. Another measure of separation is based on an area of the extracted locations. Yet another method of distinguishing between these cases is based on a morphological operation on the extracted objects, wherein all extracted objects connected after applying the morphological operation are considered to be fragments of the same real-world object.

First Occurrence Split Determination (FOSD) methods, known in the art, perform the distinguishing step on the first occurrence of the detection of the multiple extracted object locations. Hence, if the FOSD method detects in the first frame that the multiple extracted objects represent a single real-world object, then future multiple object detections in later frames will also be marked to represent a single real-world object, even if the multiple object detections move far apart.

Per-Frame Split Determination (PFSD) methods, known in the art, perform the distinguishing step in every frame in which multiple extracted locations are provided. PFSD methods track objects separately only from the frame in which the distinguishing step detects objects splitting. Thus, if the detection of the splitting is late, then the time and location of the split will be incorrect.

A method to be called the Backdating Objects Splitting (BOS) method is applied to tracks associated with a frame sequence when it is determined that an object that had previously been associated with a single (parent) track has split into multiple objects associated with multiple tracks due to an object separation event. That is, a compound object, represented by a single parent track, has separated into multiple constituent objects. Note that a compound object differs from a compound detection: a compound object represents multiple real-world (constituent) objects; a compound detection represents multiple detections (fragments) associated with a single track which are treated as being for the same real world object. A constituent object may be a compound object by itself. Each one of the multiple constituent objects arising from an object separation event is represented by an independent child track. If the single parent track prior to the object separation event was previously associated with multiple potential fragments (i.e., a compound detection), then it is hypothesised that the object separation event actually occurred when multiple potential fragments were first associated with the single parent track.

In one arrangement of the BOS method, heuristics are applied to determine whether an un-associated detection was formerly part of an existing track, but now forms an independent track. That is, to determine whether a single parent track has split into a plurality of child tracks. Further, if the single track had multiple detections associated with the single track in previous frames (i.e., the single track was fragmented), then the fragmented detections in those previous frames are associated retrospectively with the plurality of child tracks.

Figure 13:
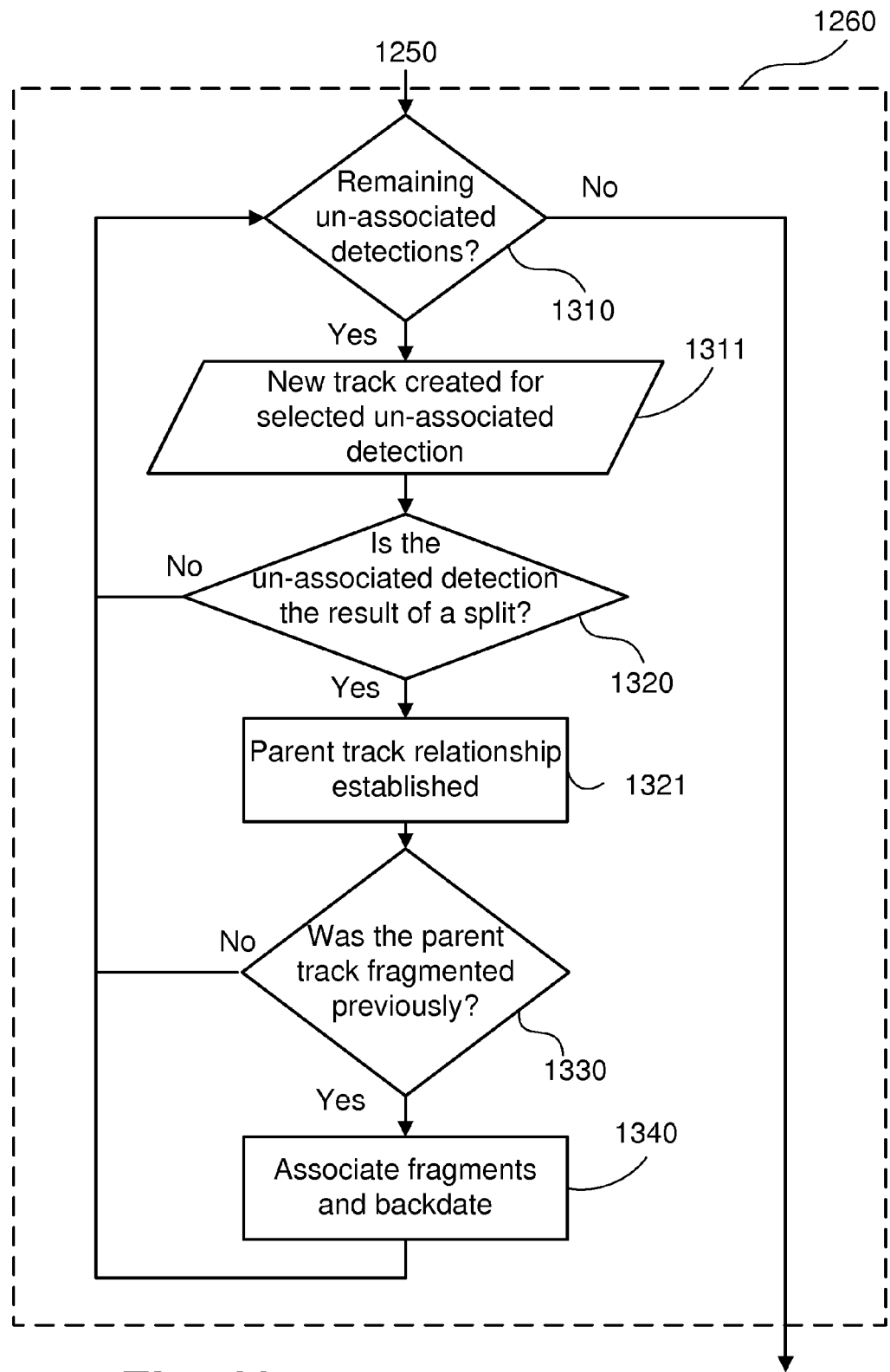
FIG. 13 is a flow diagram that illustrates functionality of one step of the remaining detection processing module used to associate incoming detections with tracks maintained by a tracking system.

FIG. 13 is a flow diagram of a decision tree outlining this process, and illustrates in detail an embodiment of the functionality of the un-associated detection processing module 1260 of FIG. 12. The un-associated detection processing module 1260 iterates over all un-associated detections. At the start of each iteration, a test 1310 is performed to determine if further un-associated detections remain. If there are un-associated detections remaining, Yes, control passes to step 1311, which selects an un-associated detection and creates a new track for the un-associated detection. Further processing is performed on this new track. Control then passes to decision step 1320 to determine whether the new track can be related to a previously existing track for which an expectation was produced during this frame of the video sequence, in which case then the previously existing track is treated as being a parent track for the new child track.

In one arrangement, the determination 1320 is performed based on the Kalman gating distance. This Kalman gating distance is calculated between the spatial representation of the detection associated with the new track, and the expectation produced by the previously existing track. A predetermined parent track continuation threshold is applied to the Kalman gating distance, for example 4.0. In another arrangement, the determination 1320 is performed based on the overlap of the detection associated with the new track 1311, and the expectation produced by the previously existing track. In yet another arrangement, the determination 1320 is made based on whether the detection associated with the new track 1311 could be a fragment of the previously existing track. If determination 1320 fails to relate the new track to a previously existing track, No, then control returns to step 1310 for the un-associated detection processing module 1260 to process further remaining un-associated detections 1310. If a track relationship is determined at decision step 1320, Yes, then control passes to associating step 1321 and the previously existing track related to the new track is considered to be a parent track and the new track is marked as a child track of the parent track. Control proceeds from associating step 1321 to decision step 1330, which determines whether the parent track had been previously fragmented.

If the decision step 1330 determines that fragmentation did not occur prior to splitting, No, then the newly created track marked as a child track in process 1321 requires no more alteration. The process returns to decision 1310.

If the decision step 1330 determines that the parent track established in step 1321 was fragmented, Yes, then the previous fragmentation of the parent track is determined to be related to the splitting of the parent track and control passes to step 1340. In one arrangement, the parent track is considered to be fragmented if at least a number of detections exceeding a fragmentation threshold were associated with the parent track in each of a predetermined number of most recent consecutive previous frames. For example, in one implementation the fragmentation threshold is two (2) and the predetermined number of most recent consecutive previous frames is five (5).

In one embodiment, frames with fragmentation of the parent track are revised in backdating procedure step 1340, such that the fragments are associated with both the parent track from 1321, and the newly created track 1311. In that case, the historical data of tracks 1311 and 1321 are also updated in step 1340 and frames from the parent track from step 1321 that contain fragmentation are revised such that the parent track is associated with only single detections in those frames. For the newly created child track 1311, tracking data is constructed from fragments from the fragmented frames. This is done such that the newly created track contains tracking data from the time of fragmentation. Importantly, due to this backdating procedure 1340, the creation frame of the new track 1311 is now set to the first frame in which fragmentation was detected in the parent track 1321.

Figure 19:
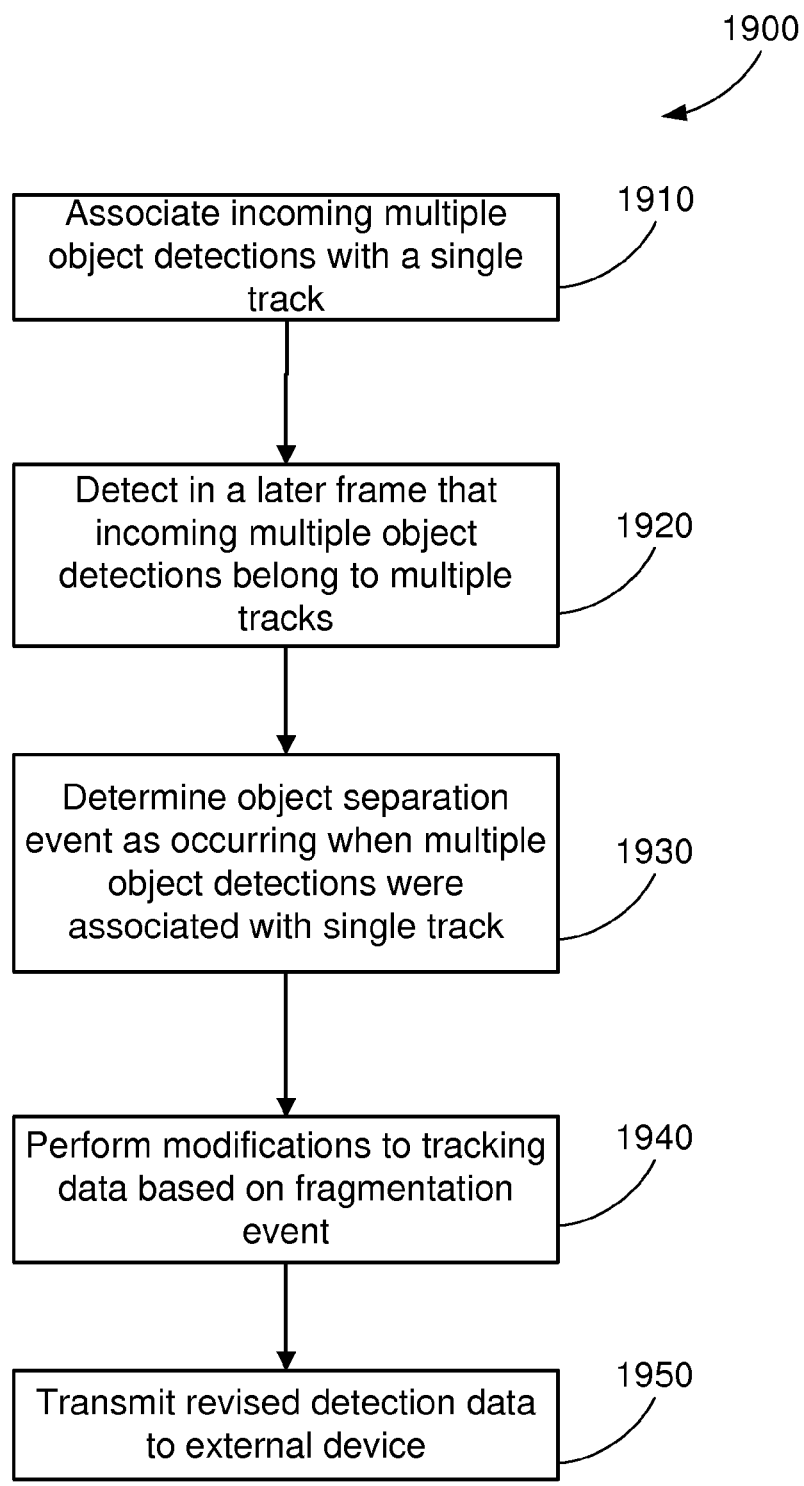
FIG. 19 is a flow diagram that illustrates functionality of a module that modifies tracking data upon detecting that an object, previously treated as fragmented, has split into a plurality of detected objects.

FIG. 19 is a flow diagram 1900 that illustrates another arrangement of the BOS method. In this arrangement, the BOS method can be performed in conjunction with the VOFD method described above, or independently of the VOFD method. In a first frame, a first set of multiple detections are received by the tracking module. An association determination module in step 1910 determines that the first set of multiple detections are to be associated with a single object that is being tracked. In one arrangement, the first set of multiple detections 420 used in the association determination step 1910 are passed to the data association module 435 of the VOFD method.

In a later frame, a second set of multiple detections are received by the tracking module. In one arrangement, the second set of multiple detections 420 are received by the data association module 435 of the VOFD method. Control passes from associating step 1910 to detection step 1920, which determines by the BOS method that the multiple detections 420 actually represent a plurality of real-world objects, rather than a fragmentation of an object or a compound object. In one arrangement, the association determination can arise because no potential fragments form a valid combination for an expectation of the tracked object, for example, as determined via combination generation module 1020. Hence, new tracks are formed for multiple detections. In one arrangement, one track is formed for each of the multiple detections. That is, each detection corresponds to one constituent object. In another arrangement, multiple tracks are formed, with each track being associated with a subset of the multiple detections. The union of the subsets is equal to the set of multiple detections, where the subsets are non-empty and can contain multiple detections, and each detection belongs to only one of the subsets. The constituent objects themselves may be compound detections.

The method 1900 continues at separation detection step 1930, in which the BOS method then determines that the object separation event occurred at a frame bounded by the first instance of associating a plurality of detections to the track 1910, and the instant at which the object separation event was detected 1920. In one arrangement, the BOS method determines at separation determination step 1930 that the object separation event occurred at the instant of associating a plurality of detections to the track 1910. As a result of this determination, the BOS method revises the tracking data processed from the fragmentation event and before the object separation event, in modifying step 1940. In one arrangement, the tracks for each of the constituent objects are altered to have a creation time corresponding to the time of fragmentation, and the parent track is altered to terminate at the time of fragmentation. In another arrangement, each of the constituent objects is tracked independently from the time of fragmentation, where the tracking data of each of the independent tracks are derived from the fragments of the single tracked object.

The object tracking system may communicate with another process or device, such as an external computing device. Control passes from modifying step 1940 to transmitting step 1950, in which the object tracking system transmits revised detection data to an external device. In one arrangement, the tracking data is periodically transmitted to an output device. In one arrangement, the period between transmissions is a regular interval, such as, for example, one frame. That is, a transmission occurs after each frame is processed. One example of an output device receiving the transmission is a tracking database stored on a computer. Another example of an output device receiving the transmission is a computer display. An output device may store its own copy of the tracking data. In applying the BOS method, revisions applied to the tracking data may also be provided to the output device, which may then apply the revisions to the copy of the tracking data stored on the output device.

In one arrangement, an external device receiving revised detection data transmitted by the BOS method at step 1950 is adapted to send an alert message to a user. In one arrangement, the alert message is sent based on the revised time of the object separation event, being the period of time that has elapsed since the revised time of the object separation event. In another arrangement, the alert message is sent based on the revised spatial location of the object separation event.

In one arrangement, the external device is a traffic counting system that counts objects passing through a traffic counting region within the field of view of a video camera. One situation in which an alert is sent to the user is now described. In this example, a compound detection is tracked as crossing a traffic counting area. Later, after crossing the traffic counting area, the object is detected splitting into multiple constituent objects. The BOS method transmits revised detection data to the traffic counting system in step 1950, indicating that the compound detection represented a compound object. Thus, multiple objects crossed the traffic counting area, and the traffic counting system sends an alert to the user to signify this event.

In another arrangement, the external device is an abandoned object detector. In one arrangement, the abandoned object detector sends an alert after a compound object splits into multiple constituent objects, where one constituent object is a person who leaves the scene, and another constituent object remains stationary (i.e., the other constituent object is abandoned by the person). The abandoned object detector sends an alert to a user if the object remains stationary for a time greater than an abandonment threshold time. The abandonment threshold time may vary depending on the particular application and may be set, for example, to 30 seconds. Upon the BOS method revising the object separation event and transmitting the revisions to the abandoned object detector, the abandoned object detector recalculates the time elapsed since the stationary constituent object split from the compound object. If the time elapsed since the revised object separation event is revised to be larger than the abandonment threshold, the abandoned object detector sends an alert to the user.

Figure 14:
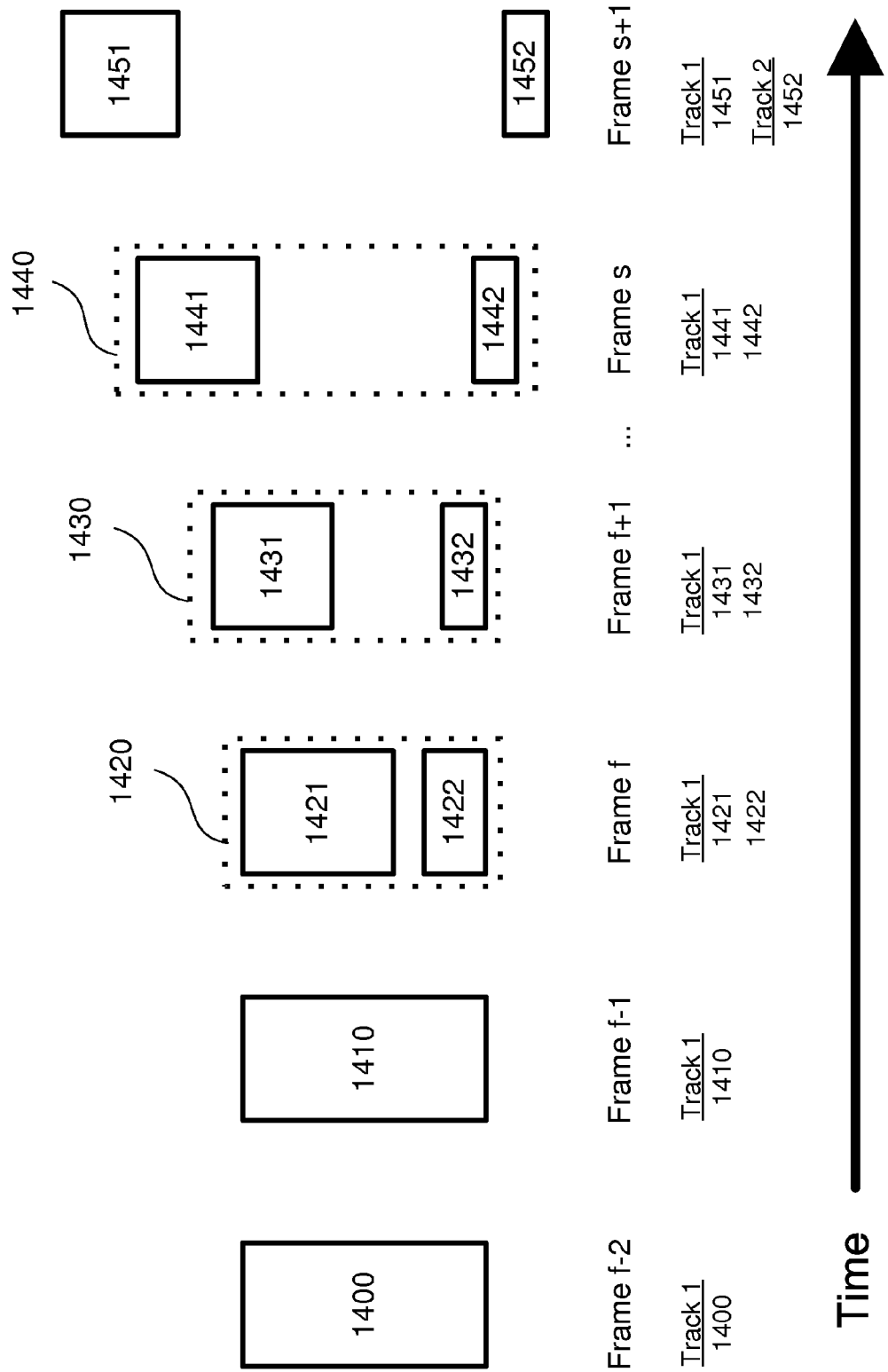
FIG. 14 is a schematic block diagram representation that illustrates an example of applying the video object fragmentation detection method to a tracked object that splits into two objects.

An example of applying the BOS method is now described with reference to FIG. 14. FIG. 14 is a schematic block diagram representation of a sequence of video frames with respect to a horizontal time axis. A single object is being tracked initially, represented by detection 1400 in "Frame f−2" and by detection 1410 in "Frame f−1". Thus, "Frame f−2" has associated frame information that includes: track 1, detection 1400. "Frame f−1" has associated frame information that includes: track 1, detection 1410. Each detection is associated with a unique identifier.

At a later frame, "Frame f", multiple detections 1421 and 1422 are associated with the track, track 1, and thus fragmentation has occurred. "Frame-f" shows a dotted line bounding box 1420 that surrounds each of the spatial representations of the detections 1421 and 1422. Note that the area of the bounding box 1420 of the spatial representations of the multiple detections is similar to the sum of the areas of the spatial representations of the multiple detections 1421 and 1422. Thus, the process 1040 allows this combination of fragments (detections 1420 and 1421) to be associated with the track, track 1. In a later frame, "Frame f+1", multiple detections 1431 and 1432 are again associated with the track, track 1, and so fragmentation continues. Again, "Frame f+1" shows a dotted line bounding box 1430 that surrounds each of the spatial representations of the detections 1431 and 1432. The area of the bounding box 1430 of the spatial representations of the multiple detections 1431, 1432 is similar to the sum of the areas of the spatial representations of the multiple detections 1431 and 1432, and thus the multiple detections can be associated with the track, track 1.

At a later frame, "Frame s", a dotted bounding box 1440 is shown that surrounds spatial representations of two detections 1441 and 1442. The ratio of the sum of the areas of the spatial representations of the detections 1441 and 1442 to the area of the bounding box 1440 of the spatial representations of the detections 1441, 1442 is determined to be less than a predetermined combination area threshold and thus detections 1441 and 1442 cannot form a valid combination. In this example, the predetermined combination area threshold is set at 0.5. Thus, only one of the detections 1441 and 1442 can be associated with the track, track 1. In one arrangement, the associated detection is determined to be the detection 1441, since the spatial representation of detection 1441 has a greater similarity measure to the expectation than the spatial representation of the detection 1442. Thus, detection 1442 is not associated with the track, track 1.

At this stage, the un-associated detection processing module 1260 of FIG. 12 is called upon to handle the un-associated detection 1442. Since in decision 1320 it is known that the un-associated detection 1442 results from an object splitting, and that in decision 1330, it is known that the parent track was previously fragmented, procedure 1340 is executed. In this example, it is clear that the spatial representation of the detection 1441 has a high similarity to the spatial representations of detections 1431 and 1421. Since the aim of procedure 1340 is to revise the parent track and remove fragmentation, the track is revised to contain associations with detections 1400, 1410, 1421, 1431 and 1441. The backdating procedure 1340 also results in a new track, track 2, being created from detection 1442 being associated with the detections 1422 and 1432 from previous frames. Hence, the new track, track 2, is now recorded as having been created in "Frame f", since track 2 contains tracking data from "Frame f" onwards, even though the split was only detected in "Frame s". In the next frame, "Frame s+1", the single detection 1451 is associated with the existing track containing the detection 1441, track 1. The single detection 1452 is associated with the newly created, backdated, track containing detection 1442, track 2.

Upon the completion of the data association module 435, as expanded upon with reference to FIG. 13, the tracking system is able to output the tracks in step 440 representing the current state of the tracking system. This concludes the fragmentation detection and data association process for a single frame, and the process ends at step 499.

The detections 1421 and 1422 in "Frame f" can be considered to constitute a first detection set, with the detections 1421 and 1422 corresponding to a compound object. The detection 1441 in "Frame s" can be considered as a detection of a second detection set corresponding to a first constituent object of the compound object from "Frame f" and the detection 1442 in "Frame s" can be considered as a detection of a third detection set corresponding to a second constituent object of the compound object. The method infers that an object separation event occurred in a frame of the sequence preceding "Frame s", based on the detection of the second and third detection sets. The second and third detection sets are determined to have evolved from at least the first constituent object of the compound object and the second constituent object of the compound object, respectively.

In one embodiment of the BOS method, data associated with the first frame, in which a first detection set including a plurality of detections corresponding to a compound object was detected, is transmitted to an external computing device. The external computing device may be implemented using the general purpose computer of FIGS. 3A and 3B, for example. In the example of FIG. 14, the first frame is "Frame f", as that was the first frame in which fragmentation was detected. The data associated with the first frame is not restricted to the detections in that frame and can include, for example, but is not restricted to, one or more events, a frame number, frame timing information, track splitting information, one or more alerts, track revision information, or any combination thereof. The events can include, for example, fragmentation events and object separation events.

In one implementation, the external computing device determines a status change, based on the transmitted data that the external computing device receives. The status change will depend on the end use application, but may include, for example, a change of a flag, enabling an alert, or disabling an alert. A change of flag may represent a fragmentation event or object separation event. In a further implementation, the external computing device applies one or more revisions to stored information, based on the status change. The stored information may relate, for example, to tracking information, or rendering information. The revisions may relate, for example, to amending track information, amending timing associated with an alert, or a combination thereof.

In another embodiment of the BOS method, the method determines a status change based on data associated with the first frame. As indicated above, the data associated with the first frame can include, for example, one or more events, a frame number, frame timing information, track splitting information, one or more alerts, track revision information, or any combination thereof. The method then transmits revision information to an external computing device, based on the status change. In a further implementation, the external computing device applies revisions to stored information, based on the transmitted revision information.

In another embodiment of the BOS method, the method transmits, to an external computing device, data associated with the frame of the sequence preceding the second frame and in which the object separation has been inferred to have occurred. The external computing device then determines a status change, based on the transmitted data.

In a further embodiment of the BOS method, the method determines a status change based on data associated with the frame of the sequence preceding the second frame and in which the object separation has been inferred to have occurred. The method then transmits revision information to an external computing device, based on the status change.

In one embodiment of the present disclosure, the method generates an alert, based on a determined status change, transmitted data received by the external computing device, transmitted revision information, revisions applied to the stored information, or any combination thereof.

Figure 15:
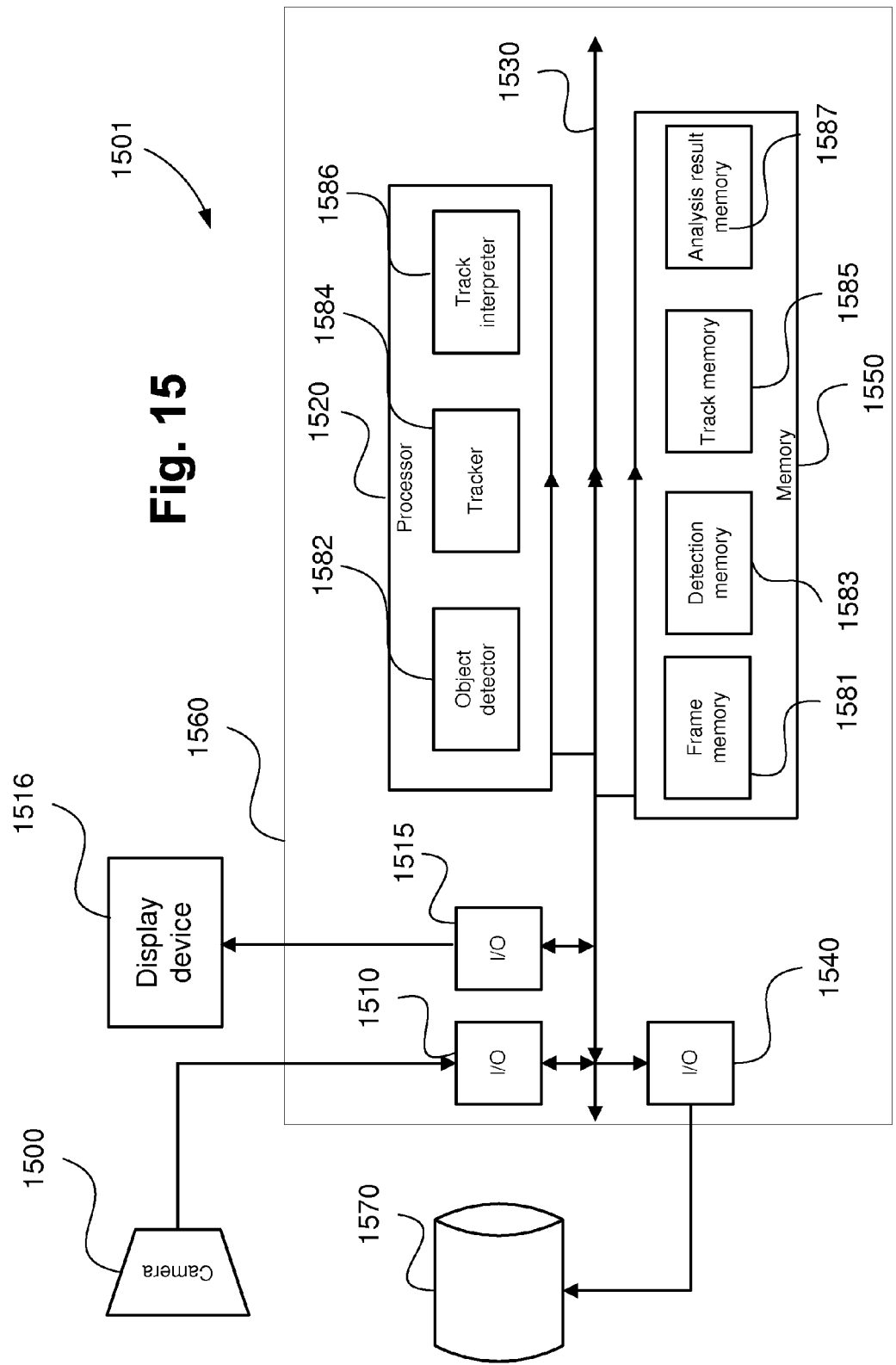
FIG. 15 is a schematic block diagram representation that illustrates a physical system in which the video object fragmentation detection method can be embedded.

FIG. 15 illustrates a system 1501 in which the video object fragmentation detection method operates. A camera 1500 obtains a sequence of one or more frames for the input frame sequence, which are received by the object processing processor 1560 (comprising tracking method 400) via an input/output interface 1510. In another embodiment, the image sequence is retrieved via a network or other communications link. In yet another embodiment, the image sequence is retrieved from a hard disk or other storage medium. The images are sent to a memory 1550 via a system bus 1530. A processor 1520 fetches, decodes, executes and writes back the operations in process 400 from memory 1550. The results from process 400 are fetched, decoded, executed and written back to memory 1550 from processor 1520. The output that is written back to memory 1550 is stored on a storage device 1570 via an input/output device 1540. In one arrangement, the output is sent via a network to a network storage server 1570. The network storage server 1570 may be connected to several object processing processors 1560 and cameras 1500. In another arrangement, the output is displayed via an input/output device 1515 on a display device 1516, such as a Liquid Crystal Display (LCD) computer monitor, a plasma television, or a cathode ray tube display unit. The display device 1516 can be used for human viewing of tracks overlayed on the video content captured by the camera. In yet another arrangement, the output is processed further by a track interpretation module, for example, writing the output back to memory 1550 for use by an object track analysis system. In one implementation, an embodiment of the video object fragmentation detection method is utilized in a behaviour detection system that monitors for loitering people and issues an alert when one or more thresholds have been reached. The thresholds may relate, for example, to the number of people, the time that a person is present in a scene, or a combination thereof.

In one arrangement, the camera capture device 1500, the object processing processor 1560, the storage server 1570, and the display device 1516 client are separate devices. In another arrangement, the camera capture device 1500 and the object processing processor 1560 are part of one intelligent camera device, while the other devices are separate. In yet another arrangement, the object processing processor 1560 and the storage server 1570 are part of one server device, while the other devices are separate. In yet another arrangement, the functionality performed by the object processing processor 1560, including the tracker module 400, is distributed over several devices. In one arrangement, depending on the availability of computational resources on camera 1500, the generation of detections 420 is done on the camera capture device 1500, while the tracking 440 is done on a server.

In one arrangement, a number of processing modules and memory modules are connected via the system bus 1530. The processing modules within object processing processor 1560 are the object detection module 1582, the tracker module 1584 and the track interpreter 1586. The memory 1550 comprises the frame memory 1581, the detection memory 1583, the track memory 1585 and the analysis result memory 1587. In one arrangement, the frame memory 1581, which stores frames received from the camera 1500, provides frame data to the object detection module 1582. The object detection module 1582 processes the frame data and produces detections which are passed to the detection memory 1583. In one arrangement, the detections are stored as bounding boxes, i.e., each detection has a location, a width and a height. Next, the tracker module 1584 receives tracking data from the track memory 1585 and detections from the detection memory 1583. The tracker 1584 associates the detections with existing tracks, and then provides methods for handling remaining un-associated detections and remaining un-associated tracks. The tracking data produced by the tracker then updates the track memory 1585. The tracks are provided to a track processor 1586 which, in one arrangement, analyzes and classifies the tracks and generates alerts for a human user based on classification rules set by the human user. The analyzed tracks are then stored in the analyzed result memory 1587.

[Alternative Arrangement]

Figure 17:
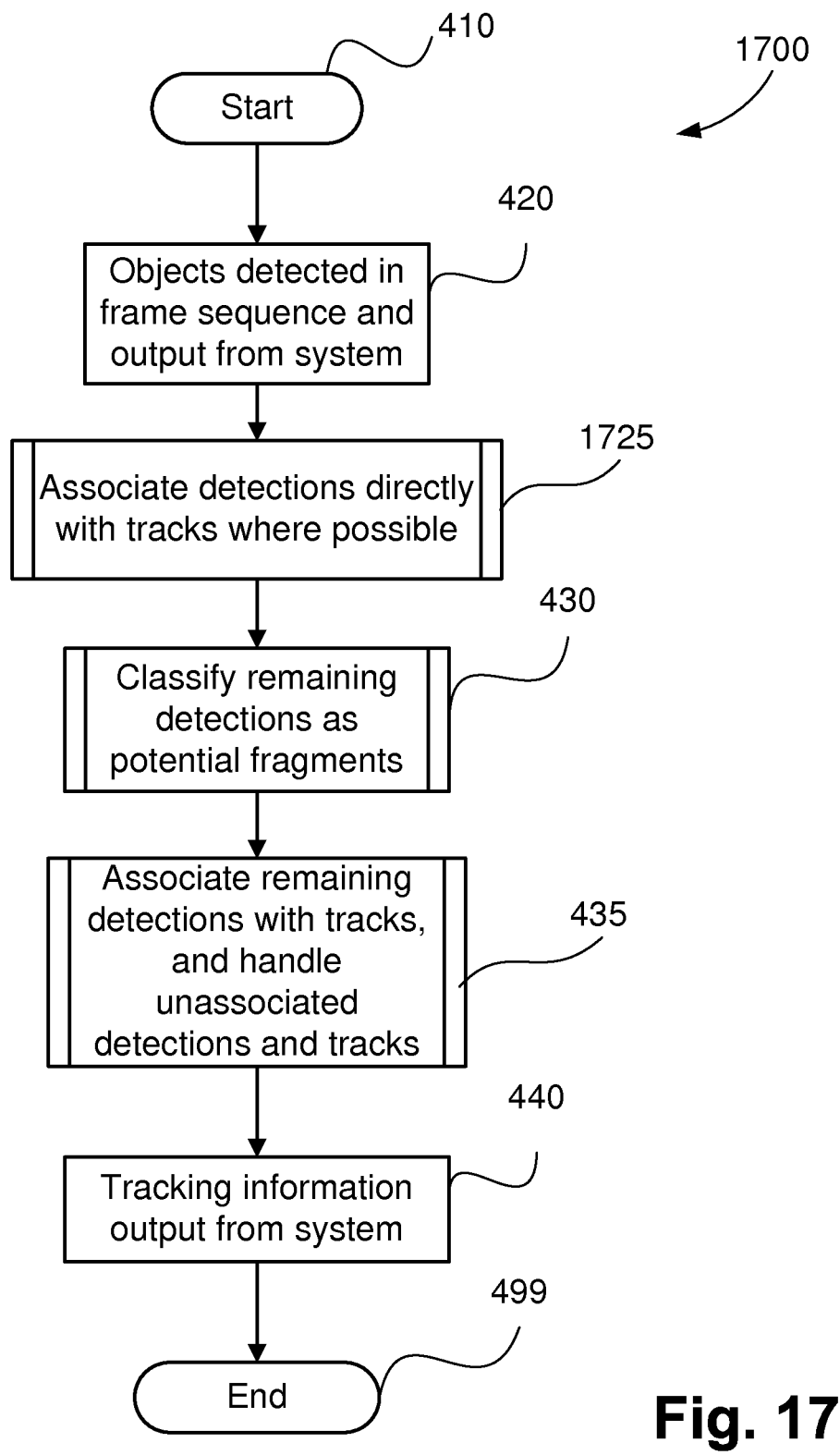
FIG. 17 is a flow diagram that illustrates functionality of an alternative embodiment of the video object fragmentation detection method.

FIG. 17 is a flow diagram 1700 that illustrates functionality of an alternative arrangement. A primary association process 1725 is performed after the step of performing video object detection in the frame sequence 420 and before the process of classifying detections as potential fragments 430. In this primary association step 1725, detections are associated directly with tracks without requiring the process of firstly determining an extended spatial representation.

Figure 18:
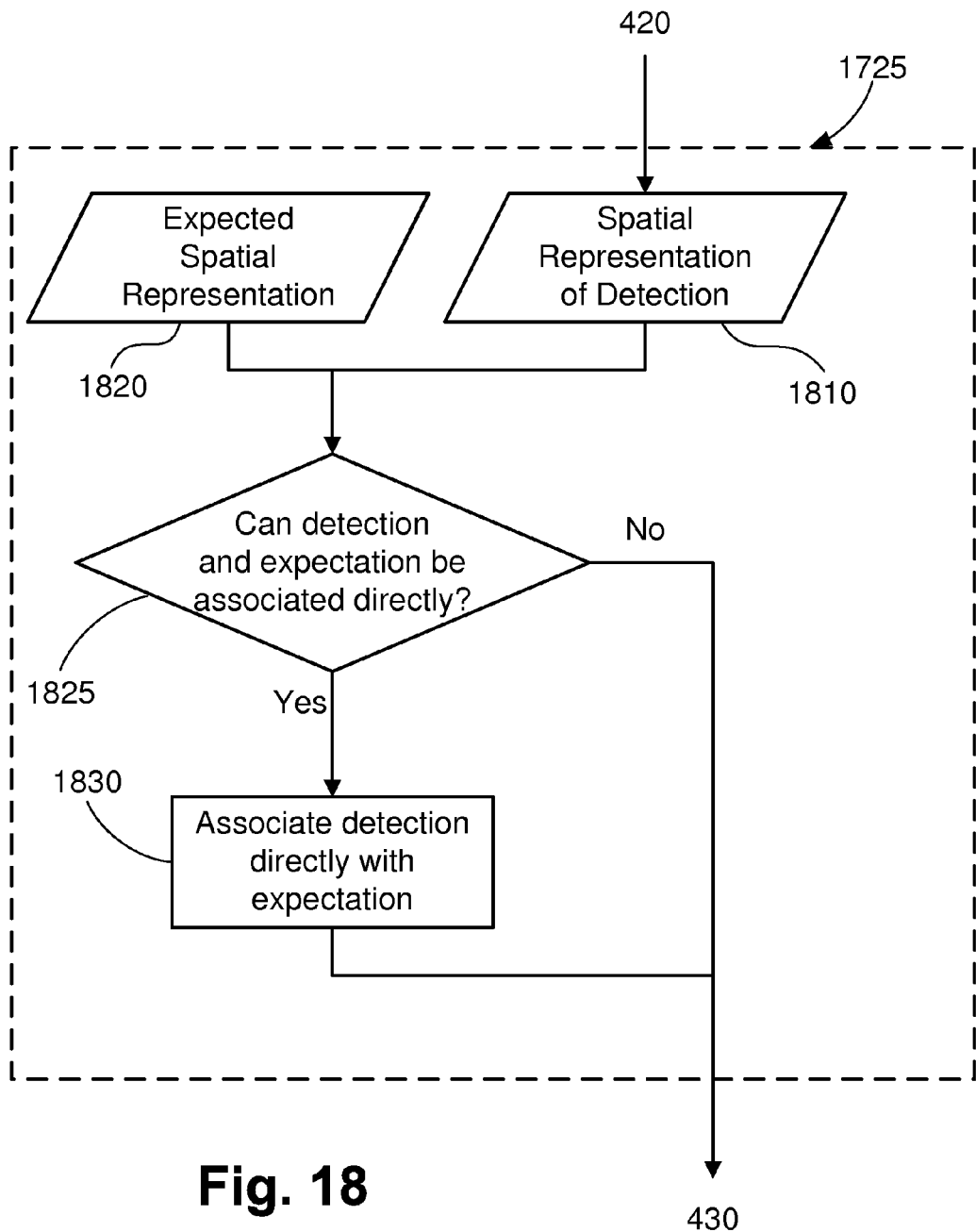
FIG. 18 is a flow diagram that illustrates functionality of a module that associates incoming detected objects with object tracks in the alternative embodiment, prior to performing the video object fragmentation detection method.

FIG. 18 expands upon the associating step 1725. Associating step 1725 makes a decision given the spatial representation of an expectation 1820 and the spatial representation of a detection 1810. The decision 1825 is based on a similarity measure. In one arrangement, the similarity measure is the gating distance as used by the Kalman Filter. The similarity measure computes the similarity between the spatial representation of the expectation 1820 and the spatial representation of the detection 1810. An association is formed 1830 if the computed similarity measure allows the expectation 1820 and the spatial representation of a detection 1810 to be associated directly. Note that this computation considers the spatial representation of the detection itself, i.e., not the expanded spatial representation of the detection.

Not all detections can be directly associated with tracks in step 1725. One reason relates to object fragmentation. The remaining un-associated detections and tracks are processed using the same sequence of steps as described above. That is, first, extended spatial representations of the detections are formed 430. Second, the detections are associated with tracks 435 by forming association hypotheses. Third, the set of all association hypotheses is reduced to an optimal non-contradictory set.

A computational advantage is provided by this arrangement. The primary association step 1725 reduces the number of potential fragments classified by step 430, which in turn reduces the number of association hypotheses that are processed in step 435.

Alternative Embodiment for Spatial Representation Expansion

Figure 16:
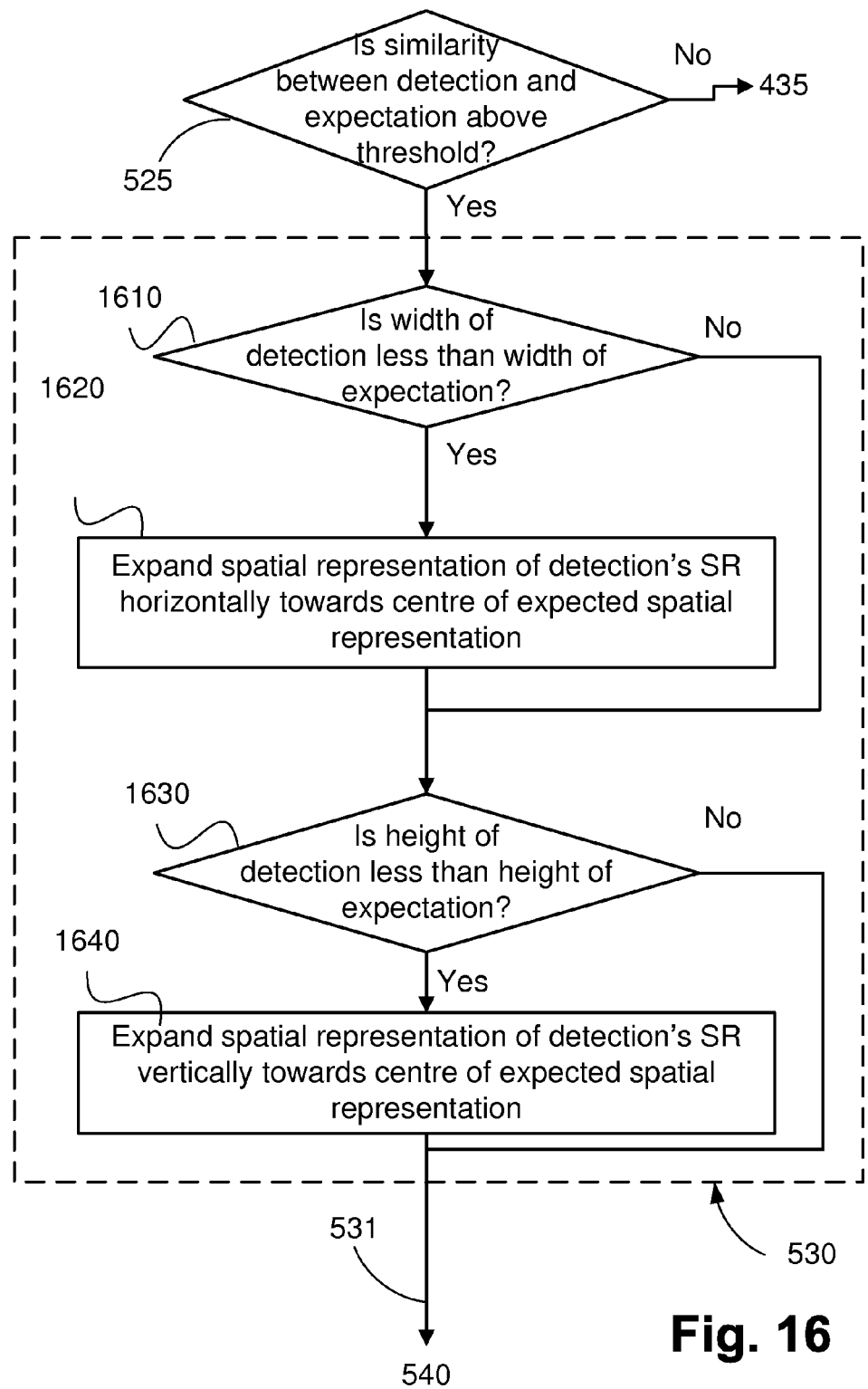
FIG. 16 is a flow diagram that illustrates functionality of an alternative embodiment of the spatial representation expansion module used to generate the extended representation used as part of the video object fragmentation detection method.

An alternative embodiment of the spatial representation expansion module 530, which utilizes the centroid of an expectation, is illustrated in the flow diagram of FIG. 16. The spatial representations of the detections are comprised of at least bounding boxes, where each box has a width and a height property, and a centre. First, the centre of the bounding box of the expectation 520 and the centre of the bounding box of the detection 510 are determined.

Width and height tests are used to extend the spatial representation of the detection. First, if the width of the spatial representation of the detection 510 is less than the width of the expectation 520, as decided by module 1610, the spatial representation of the detection is expanded horizontally in step 1620. The expansion is performed in one direction only. That is, the expansion is performed in the direction formed by the horizontal component of the vector pointing from the centre of the spatial representation of the detection 510 to the centre of the expected spatial representation 520. If the horizontal component of this vector is equal to zero, the direction of the horizontal expansion is chosen arbitrarily.

Second, module 1630 determines whether the height of the spatial representation of the detection 510 is less than the height of the expectation 520. If this is so, the spatial representation of the detection is expanded vertically in step 1640. This expansion is performed in one direction only; it is performed in the direction formed by the vertical component of the vector pointing from the centre of the spatial representation of the detection 510 to the centre of the expected spatial representation 520. If the vertical component of this vector is equal to zero, the direction of the vertical expansion is chosen arbitrarily.

The result of using this alternative embodiment is that the extended spatial representation of the detection 531 will have the same or similar dimensions as an extended spatial representation of the detection extended using the method in FIG. 6 and FIG. 7. However, the location of the extended spatial representation may differ.

[Camera Implementation]

Figure 23:
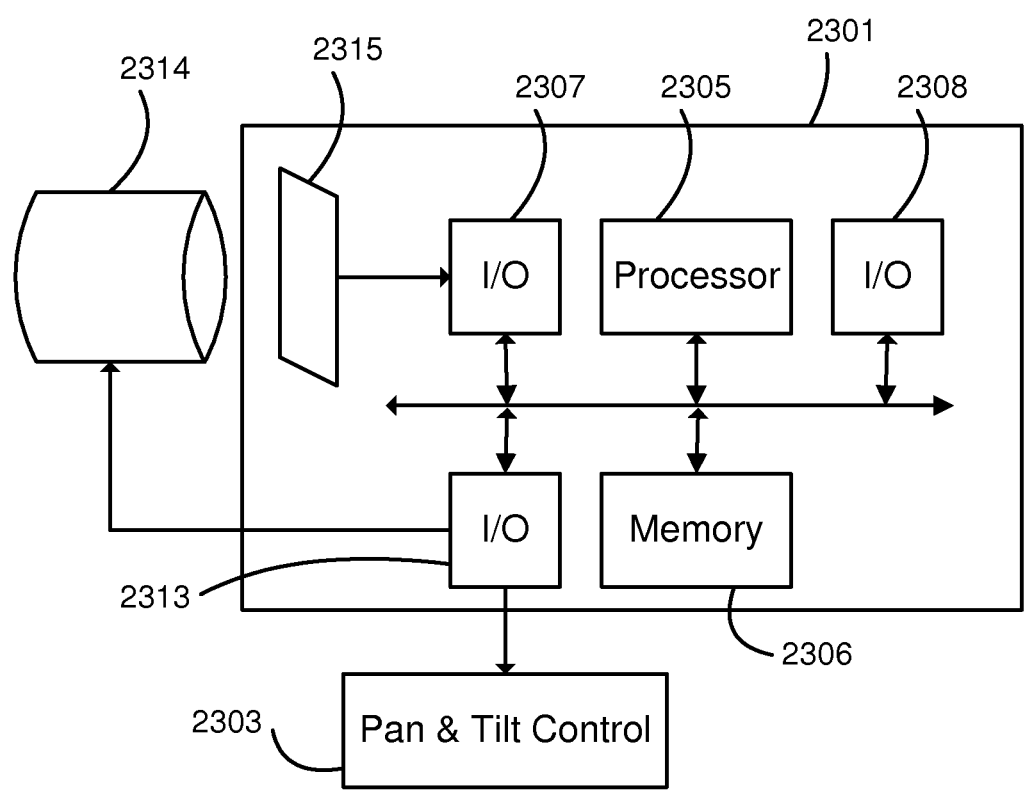
FIG. 23 shows a schematic block diagram of a camera upon which the methods of FIGS. 4 to 22 may be practiced.

One implementation of a system in accordance with the present disclosure is embodied in a camera. FIG. 23 shows a schematic block diagram of a camera 2300 upon which the extension of a spatial representation of a detection and determination of an extended spatial similarity may be practiced. In one implementation, steps 420 to 440 of FIG. 4 are implemented as software executable within the camera 2300. The steps 420 to 440 may be performed on a single processor or on multiple processors, either within the camera or external to the camera 2300.

The camera 2300 is a pan-tilt-zoom camera (PTZ) formed by a camera module 2301, a pan and tilt module 2303, and a lens system 2314. The camera module 2301 typically includes at least one processor unit 2305, and a memory unit 2306, a photo-sensitive sensor array 2315, an input/output (I/O) interfaces 2307 that couples to the sensor array 2315, an input/output (I/O) interfaces 2308 that couples to a communications network 2320, and an interface 2313 for the pan and tilt module 2303 and the lens system 2314. The components 2305 to 2313 of the camera module 2301 typically communicate via an interconnected bus 2304 and in a manner which results in a conventional mode of operation known to those in the relevant art.

The pan and tilt module 2303 includes servo motors which, in response to signals from the camera module 2301, move the camera module 2301 about the vertical and horizontal axes. The lens system 2314 also includes a servo motor which, in response to signals from the camera module 2301, is adapted to change the focal length of the lens system 2314.

Further Embodiments of the BOS Method

The BOS method provides advantages when compared to the PFSD and FOSD methods known in the art. One improvement is demonstrated upon detecting that the provided detections represent constituent objects of a compound object being tracked. In this case, the constituent objects are tracked from the time that the compound object was first associated with multiple detections. Decisions and further processing depending on split detection are more robust due to the more accurate split detection by the BOS method.

For example, an object counting application, such as a traffic counter, relies on the accurate tracking of individual objects passing through an area in a video frame. Consider where two people are being tracked as a single object, such as may occur when the two people are detected in a video frame as a single compound object due to occlusion (i.e., the two objects are overlapping from the point of view of the camera). Next, consider that the two people gradually begin to move apart, and at some point are detected as two neighbouring objects in a fragmentation frame. The tracker treats the two detected objects as fragments of the same real-world object, because of the relative proximity of the two detected objects. If, whilst in this fragmented state, the two people enter a traffic counting area, the traffic counter counts only one object crossing the area, since at this stage, only one object is being tracked. Due to the single compound object crossing the traffic counting area, a "count" event is communicated to the user.

In a later frame, if the two people separate further and are tracked as two independent real-world objects, the BOS method is applied as soon as the two people are detected to have split (in said later frame). The two people are now tracked independently from the fragmentation frame. Since the people entered the traffic counting area after the fragmentation frame, applying the BOS method results in both people being now counted as passing through the traffic counting area. With the revision capability provided by the BOS method, a "revised count" event is communicated to the user. Thus, the BOS method can provide an improvement in traffic counting applications.

In another example of the BOS method, a tracking method becomes less sensitive to noise without a tradeoff with reliability. The extracted object locations provided to object tracking methods sometimes contain false positive object detections. Some object tracking methods attempt to track these false positive detections. Tracks arising from false positive detections are often very short, and some object tracking methods delete tracks that are less than a predetermined number of frames in length. Sometimes, such tracks are not formed due to false detections, but instead track a real-world object that is detected for only a small number of frames, in which case the track should not be deleted. There is a trade-off between deleting small tracks and having false positive tracks, for example, as determined by applying the false positive track length threshold. The BOS method provides robustness in the case where an object splits into a plurality of objects, at least one of which is visible for only a short time after the split event. If the tracked object was fragmented before splitting, applying the BOS method will result in an increase in the length of the child tracks. Thus, it is less likely that a tracking method applying a false positive track length threshold will classify the child track as a false positive track and subsequently delete the track. Thus, one embodiment of the present disclosure may result in fewer tracks being removed incorrectly following detection of a split.

Figure 20:
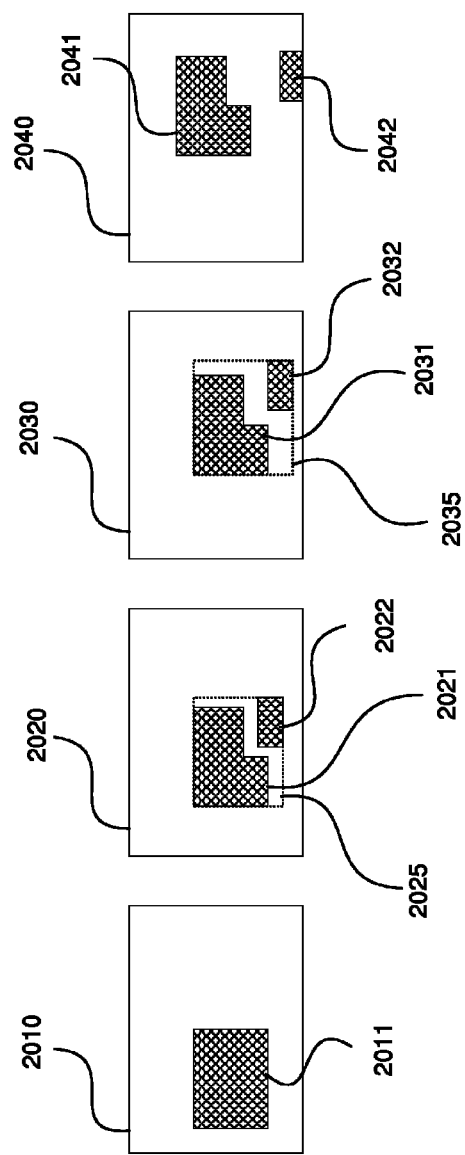
FIG. 20 is a schematic block diagram representation that illustrates an object moving through a scene, fragmenting, and later splitting into multiple objects.

FIG. 20 illustrates an example of providing robustness where an object splits into a plurality of objects, at least one of which is visible for only a short time after the split event. Detected objects within consecutive frames from a frame sequence are illustrated. In a first frame 2010, a single object 2011 is detected. In a second frame 2020, immediately following the first frame 2010, two objects 2021 and 2022 are detected. These detections are sufficiently close that an object fragmentation detection method, for example, the VOFD method, may regard the detections 2021 and 2022 as fragments of the same object 2025.

In a third frame 2030, immediately following the second frame 2020, two objects 2031 and 2032 are detected. Again, these detections are sufficiently close that an object fragmentation detection method may regard the detections 2031 and 2032 as fragments of the same object 2035. In a fourth frame 2040, immediately following the third frame 2030, two objects are again detected, 2041 and 2042. In the fourth frame 2040, the two detections 2041 and 2042 are sufficiently distant that they can be considered as representing independent objects. Thus, in the fourth frame 2040, the original object 2011 has been detected to have split into two objects 2041 and 2042.

Figure 21:
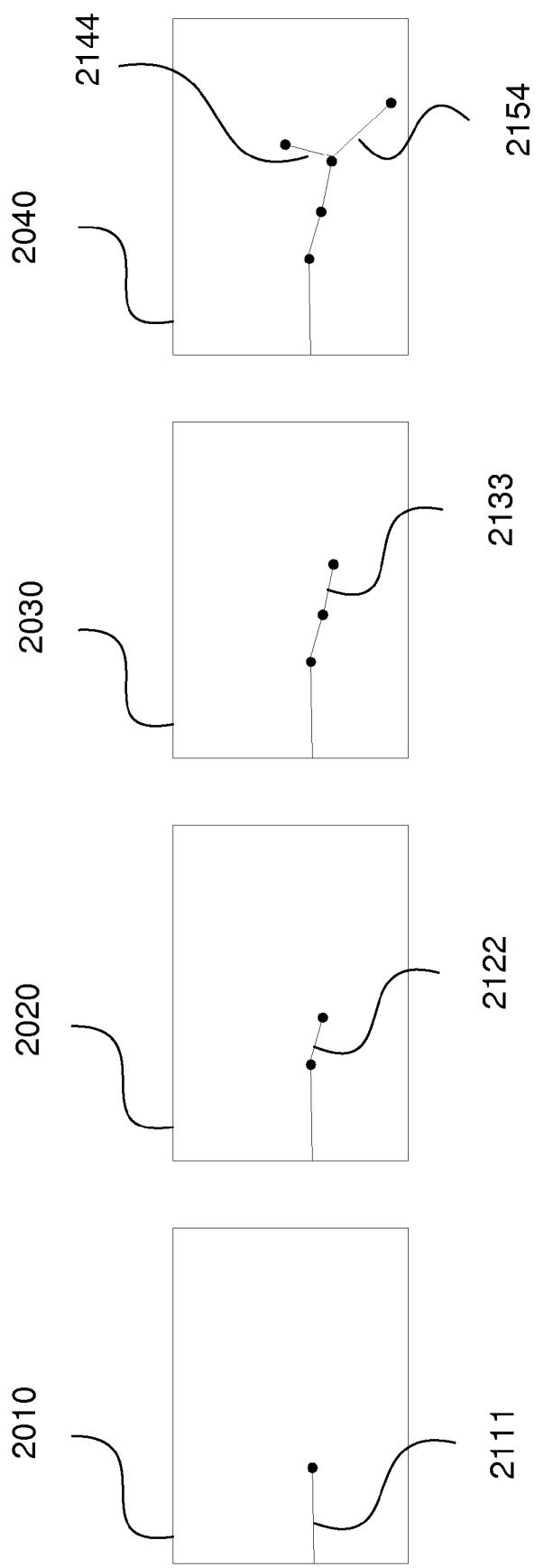
FIG. 21 is a schematic block diagram representation that illustrates the output of applying a per-frame split detection (PFSD) method to the objects detected in each frame illustrated in FIG. 20.

FIG. 21 illustrates the output of applying a PFSD method to the objects detected and shown in FIG. 20. In the first frame 2010, the object trajectory 2111 is shown. In the second frame 2020, the object is marked as being fragmented. Thus, the bounding box 2025 of FIG. 20 enclosing the fragments 2021 and 2022 represents the tracked object. The movement of the object since the first frame 2010 is shown by line segment 2122. In the third frame 2030 of FIG. 21, the PFSD method determines whether the two detections 2031 and 2032 represent either a single fragmented object or two independent objects. Again, the detections represent a single fragmented object. The line segment 2133 represents the movement of the object from the second frame 2020 to the third frame 2030. In the fourth frame 2040, the PFSD method determines whether the two detections 2041 and 2042 represent a single fragmented object, or two independent objects. In the fourth frame 2040, the detections represent two independent objects. Hence, each detection is tracked independently. Line segment 2144 illustrates the movement of the fragment 2041 from the centre of the single fragmented parent object in the third frame 2035. Line segment 2154 illustrates the movement of the fragment 2042 from the centre of the single fragmented parent object in the third frame 2035.

Figure 22:
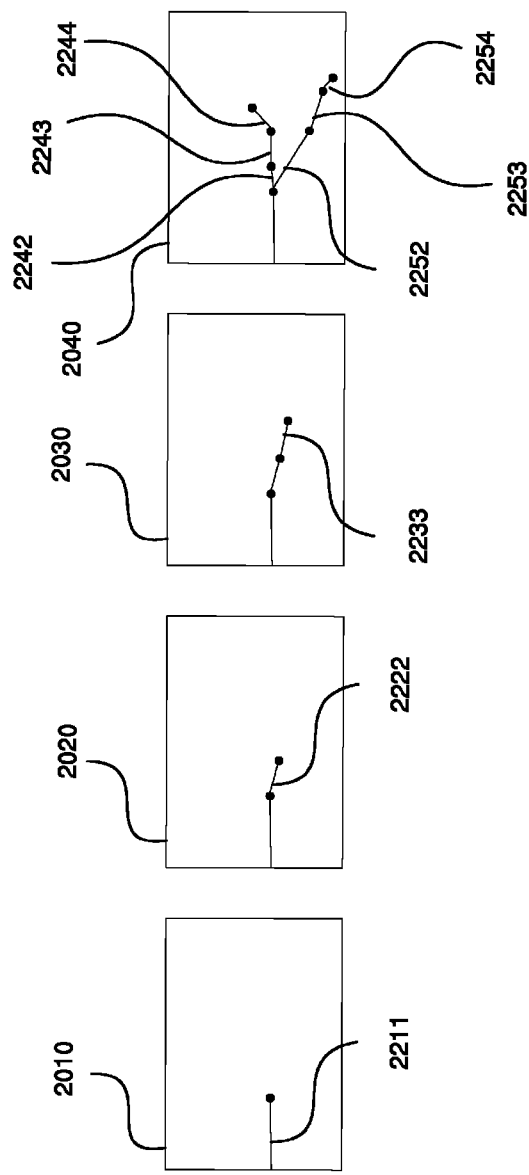
FIG. 22 is a schematic block diagram representation that illustrates the output of applying the backdating object splitting (BOS) method to the objects detected in each frame illustrated in FIG. 20.

FIG. 22 illustrates the output of applying the BOS method to the objects detected and shown in FIG. 20. In the first frame 2010, the object trajectory 2211 is shown. In the second frame 2020, the object is marked as being fragmented. Thus, the bounding box 2025 enclosing the fragments 2021 and 2022 represents the tracked object. The movement of the object since the first frame 2010 is shown by line segment 2222. In the third frame 2030, the BOS method determines whether the two detections 2031 and 2032 represent a single fragmented object, or two independent objects. Again, the detections represent a single fragmented object. The line segment 2233 represents the movement of the object from the second frame 2020 to the third frame 2030. In the fourth frame 2040, the BOS method determines whether the two detections 2041 and 2042 represent a single fragmented object, or two independent objects. In the fourth frame 2040, the detections represent two independent objects. Hence, each detection is tracked independently. Further, and in contrast to the PFSD method, the independent tracking commences from the point at which the object was first detected to be fragmented, which in this example was in the first frame 2010.

From examining the frames in FIG. 20, it is clear that the object being fragmented in the second frame 2020 was due to the beginning of the object splitting into two objects 2041 and 2042. The BOS method thus determines that the objects separated in the second frame. Furthermore, the BOS method determines the tracking data of the separated objects from the second frame onwards. The trajectory segments 2222 and 2233, representing the trajectory data of the fragmented object in frames 2020 and 2030 respectively, are replaced. The detection 2021 is associated with detections 2031 and 2041 in later frames. Trajectory segment 2242 represents the motion as detection 2011 is associated with fragment 2021. Trajectory segment 2243 represents the motion as fragment 2021 is associated with fragment 2031. Trajectory segment 2244 represents the motion as fragment 2031 moves to detection 2041. Similarly, trajectory segments 2252, 2253 and 2254 represent the motion as the object is detected as detection 2002, fragment 2012, fragment 2013, and detection 2014, respectively. In the presented example, the BOS method provides a more realistic interpretation of the actual object motion than the PFSD method.

INDUSTRIAL APPLICABILITY

The arrangements described are applicable to the computer and data processing industries and particularly for the imaging and security industries.

Single Frame Clustering (SFC) fragmentation detection approaches, known in the art, treat all detections within a certain distance of each other as being the same object. This can lead to the merging of objects which are coincidentally close but should not be merged. As a result, this can cause additional detection failures.

The video object fragmentation detection (VOFD) method classifies each detection independently as a potential fragment of a track. The classification process does not consider the classifications of nearby, potentially unrelated detections. Thus, the VOFD method provides more correct results in associating detections to tracks than SFC approaches.

An SFC approach can also create objects that are not recognizably part of any track, which again leads to the inappropriate creation of new tracks. In contrast, the VOFD method evaluates all combinations of potential fragments in turn, leading to a set of association hypotheses. This set of association hypotheses is reduced to a non-contradictory subset based on a similarity measure. In one arrangement, the similarity measure is based on the gating distance used by the Kalman Filter. This similarity measure incorporates the similarity of the position and size of the spatial representation of the expectation and the position and size of the combination of the spatial representations of the detections. Thus, the VOFD method allows for the combination of detections that together are most appropriately matched to the expectation, to be chosen for association with the expectation's source track. The individual detections do not spawn new false positive tracks in this case.

In Bounding Box Limited (BBL) detection approaches, the expectation is first expanded to allow for error. Then, all detections with spatial representations smaller than the spatial representation of the expectation and falling within the area of the extended spatial representation are determined. The determined detections are treated as partially-detected components of the track being estimated. Thus, the BBL method is limited to correcting detections which are smaller than the expectation and/or falling within said expanded area. In contrast, an embodiment of the presented VOFD method is able to classify detections with spatial representations larger than the expectation as being related to the expectation. These detections result in the extended spatial representation output by module in step 530 of FIG. 5 being equivalent to the spatial representation of the detection 410.

Further, VOFD is able to classify fragments whose spatial representations fall outside of the extended spatial representations. In one arrangement, the extended spatial similarity measure determined in step 540 of FIG. 5 is used to classify detections as potential fragments based on the Kalman Filter gating distance. Thus, VOFD provides an optimal measure as used in Kalman Filter tracking. Further, VOFD can classify potential fragments based only on the similarity between the spatial representation of the expectation 520 and the extended spatial representation of the detection 530. This classification does not require an expanded area to be constructed based on non-optimal values.

The foregoing describes only some embodiments of the present invention, and modifications and/or changes can be made thereto without departing from the scope and spirit of the invention, the embodiments being illustrative and not restrictive.

We claim:

1. A computer-implemented method of determining a current spatial representation for a detection in a current frame of an image sequence, said method comprising the steps of:
   deriving an expected spatial representation for said detection based on at least one previous frame;
   generating a spatial representation of said detection;
   extending said spatial representation to obtain an extended spatial representation, based on the expected spatial representation;
   determining a similarity measure between said extended spatial representation and said expected spatial representation; and
   determining the current spatial representation for the detection based on said similarity measure.

2. The method according to claim 1, wherein said extending step includes at least one of:
   extending at least one dimension of said spatial representation of said detection;
   augmenting said spatial representation of said detection with an augmenting spatial representation; and
   extending said expected spatial representation to obtain the extended spatial representation, based on said spatial representation of said detection.

3. The method according to claim 1, comprising the further step of:
   associating said extended spatial representation with a track, if the determined similarity measure exceeds a predetermined threshold.

4. The method according to claim 1, comprising the further step of:
   classifying said detection as one of a false positive and a true positive, based on the determined similarity measure.

5. The method according to claim 1, comprising the further step of:
   determining an initial spatial similarity between said spatial representation of said detection and said expected spatial representation;
   wherein said steps of extending said spatial representation and determining said similarity measure are performed if the initial spatial similarity exceeds a direct association threshold.

6. The method according to claim 5, wherein said steps of determining said initial spatial similarity and determining the similarity measure are performed using the same spatial similarity method.

7. The method according to claim 4, wherein said track is derived from at least one image sequence.

8. A computer-implemented method of associating at least one of a plurality of detections in a frame of an image sequence with a track, said method comprising the steps of:
   for each one of said plurality of detections:
      determining an initial spatial similarity measure between an expected spatial representation associated with said track and a spatial representation of said detection;
      determining an extended similarity measure between said expected spatial representation of said track and an extended spatial representation of said detection; and
      associating said detection with said track, based on at least one of:
         (i) said initial spatial similarity measure exceeding a direct association threshold; and
         (ii) said extended similarity measure exceeding a fragment similarity threshold.

9. The method according to claim 8, comprising the further steps of:
   generating a plurality of association hypotheses, each association hypothesis including an association between said track and at least one detection from a set of detections derived from said frame, wherein generating each one of said plurality of association hypotheses includes the steps of:
      selecting, from the set of detections, a combination of detections to be associated with that respective association hypothesis; and
      calculating a matching similarity score, for that respective association hypothesis, between said track and a spatial representation of said selected combination of detections; and
   selecting one of said plurality of association hypotheses, based on said respective matching similarity scores, wherein said plurality of detections correspond to said combination of detections associated with said selected association hypothesis.

10. The method according to claim 8, wherein:
each detection of said set of detections corresponds to at most one association hypothesis.

11. The method according to claim 8, wherein:
each one of said expected spatial representations corresponds to at most one association hypothesis.

12. The method according to claim 8, wherein:
calculating each matching similarity score is based on:
(i) a number of detections in the combination of detections associated with the respective association hypothesis, and
(ii) at least one of: area, density, geometric distance, height, width or visual properties of the spatial representation of said selected combination of detections.

13. A camera system for classifying a detection in a frame of an image sequence as a fragment of a video object in said frame, based on a spatial similarity between said detection and an expected spatial representation for a track associated with said image sequence, said camera system comprising:
a lens system;
a camera module coupled to said lens system to capture at least one frame in said image sequence;
a storage device for storing a computer program; and
a processor for executing the program, said program comprising:
code for deriving an extended spatial representation from a spatial representation of said detection, wherein at least one dimension of said extended spatial representation is at least as large as a corresponding dimension of said expected spatial representation;
code for determining an extended spatial similarity measure between said extended spatial representation and said expected spatial representation; and
code for determining said detection to be a fragment of said video object, if the extended spatial similarity measure exceeds a fragment similarity threshold.

14. The camera system according to claim 13, wherein said program further comprises:
code for detecting said detection in said frame by utilizing a foreground separation method; and
code for determining said spatial representation of said detection.

15. A computer-implemented method of associating an association hypothesis with a track associated with an image, based on a plurality of fragments detected in said image, said method comprising the steps of:
generating a plurality of association hypotheses based on said track and said plurality of fragments detected in the image, each association hypothesis including an expectation associated with said track and a combination of at least one fragment associated with said expectation;
for each association hypothesis, performing the steps of:
determining a matching similarity score, based on said expectation and at least one characteristic of at least one fragment in the combination in the association hypothesis;
determining a value to adjust the matching similarity score corresponding to a number of fragments in the combination in the association hypothesis; and
adjusting the matching similarity score based on the determined value;
selecting an association hypothesis from said plurality of association hypotheses, based on the adjusted matching similarity scores of the association hypotheses; and
associating said selected association hypothesis with said track.

16. The method according to claim 15, wherein said at least one characteristic is selected from the group of characteristics consisting of: area, density, geometric distance, height, width, and visual properties of said at least one fragment.

17. The method according to claim 16, wherein adjusting the matching similarity score includes applying a bias.

18. A computer-implemented method of associating an association hypothesis with a track associated with an image, based on a fragment detected in said image and a plurality of tracks associated with said image, said method comprising the steps of:
generating a plurality of association hypotheses based on said fragment and said plurality of tracks, each association hypothesis including said fragment detection and a combination of at least one expectation associated with said detection, wherein each expectation is associated with one of said tracks;
for each association hypothesis, performing the steps of:
determining a similarity score for each association hypothesis, based on said fragment detection and at least one characteristic of at least one track in the combination in the association hypothesis;
determining a value to adjust the determined similarity score corresponding to a number of track expectations included in the hypothesis; and
adjusting the similarity score based on the determined value;
selecting an association hypothesis, based on the similarity scores for the association hypotheses; and
associating said selected association hypothesis with said track.

19. A method of determining a detection to be a fragment of a video object in a video frame sequence, based on a spatial similarity between a track associated with said video frame sequence and said detection in a video frame of said video frame sequence, said method comprising the steps of:
deriving an extended spatial representation from a spatial representation of said detection, wherein at least one dimension of said extended spatial representation is at least as large as a corresponding dimension of an expected spatial representation of said track;
determining an extended spatial similarity measure between said extended spatial representation and said expected spatial representation; and
determining said detection to be a fragment of said video object when said extended spatial similarity measure exceeds an extended representation similarity threshold.

* * * * *